(12) United States Patent
Kim et al.

(10) Patent No.: US 10,542,186 B2
(45) Date of Patent: Jan. 21, 2020

(54) 2D LUT COLOR TRANSFORMS WITH REDUCED MEMORY FOOTPRINT

(71) Applicant: DOLBY LABORATORIES LICENSING CORPORATION, San Francisco, CA (US)

(72) Inventors: Joonsoo Kim, Los Angeles, CA (US); Jon S. McElvain, Manhattan Beach, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 91 days.

(21) Appl. No.: 15/760,482

(22) PCT Filed: Sep. 29, 2016

(86) PCT No.: PCT/US2016/054395
§ 371 (c)(1),
(2) Date: Mar. 15, 2018

(87) PCT Pub. No.: WO2017/059043
PCT Pub. Date: Apr. 6, 2017

(65) Prior Publication Data
US 2018/0255206 A1  Sep. 6, 2018

Related U.S. Application Data

(60) Provisional application No. 62/235,357, filed on Sep. 30, 2015.

(30) Foreign Application Priority Data

Nov. 13, 2015  (EP) .................................. 15194486.5

(51) Int. Cl.
*H04N 1/60* (2006.01)
*H04N 5/262* (2006.01)

(52) U.S. Cl.
CPC ......... *H04N 1/6019* (2013.01); *H04N 1/6005* (2013.01); *H04N 5/2628* (2013.01)

(58) Field of Classification Search
CPC .......... G09G 5/02; G09G 5/06; H04N 1/6019; H04N 1/6025; G06F 17/16
See application file for complete search history.

(56) References Cited

U.S. PATENT DOCUMENTS

| | | | |
|---|---|---|---|
| 5,533,173 A | 7/1996 | Wober | |
| 5,880,744 A * | 3/1999 | Bradstreet | ............. G06T 11/001 345/427 |
| 6,026,180 A | 2/2000 | Wittenstein | |
| 6,657,746 B1 | 12/2003 | Fuchigami | |
| 6,781,596 B2 | 8/2004 | Falk | |
| 6,992,683 B2 | 1/2006 | Shin | |

(Continued)

FOREIGN PATENT DOCUMENTS

| | | |
|---|---|---|
| JP | 2014-200014 | 10/2014 |
| WO | 2015/065890 | 5/2015 |

*Primary Examiner* — Antonio A Caschera

(57) ABSTRACT

A memory footprint of look up tables for color transforms can be reduced by separating the look up tables into factors, applying frequency domain transforms, dividing the look up tables into zones, or establishing hierarchical levels with increasing resolution. The methods can be applied to still image or video cameras with limited computation resources that can benefit from reduced memory footprints.

11 Claims, 15 Drawing Sheets

(56) References Cited

U.S. PATENT DOCUMENTS

| | | |
|---|---|---|
| 7,200,263 B2 | 4/2007 | Curry |
| 7,697,165 B2 | 4/2010 | Osaki |
| 7,701,451 B1 | 4/2010 | Daewon |
| 7,760,398 B2 | 7/2010 | Kawai |
| 7,826,111 B2 | 11/2010 | Won |
| 8,050,496 B2 | 11/2011 | Pan |
| 8,249,340 B2 | 8/2012 | Monga |
| 8,363,292 B2 | 1/2013 | Sugiura |
| 8,526,062 B2 | 9/2013 | Klassen |
| 8,847,976 B2 | 9/2014 | Ollivier |
| 8,929,654 B2 | 1/2015 | Gish |
| 8,947,549 B2 | 2/2015 | Gish |
| 2004/0257595 A1 | 12/2004 | Sharma |
| 2005/0190205 A1 | 9/2005 | Koyama |
| 2008/0131019 A1 | 6/2008 | Ng |
| 2012/0251013 A1 | 10/2012 | Porikli |

\* cited by examiner

2D LUT COLOR TRANSFORMS WITH REDUCED MEMORY FOOTPRINT

CROSS-REFERENCE TO RELATED APPLICATION

This application claims priority to U.S. Provisional Patent Application No. 62/235,357, filed on Sep. 30, 2015 and European Patent Application No. 15194486.5, filed on Nov. 13, 2015, each of which is incorporated herein by reference in its entirety.

TECHNICAL FIELD

The present disclosure relates to color processing. More particularly, it relates to 2D LUT color transforms with reduced memory footprint.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
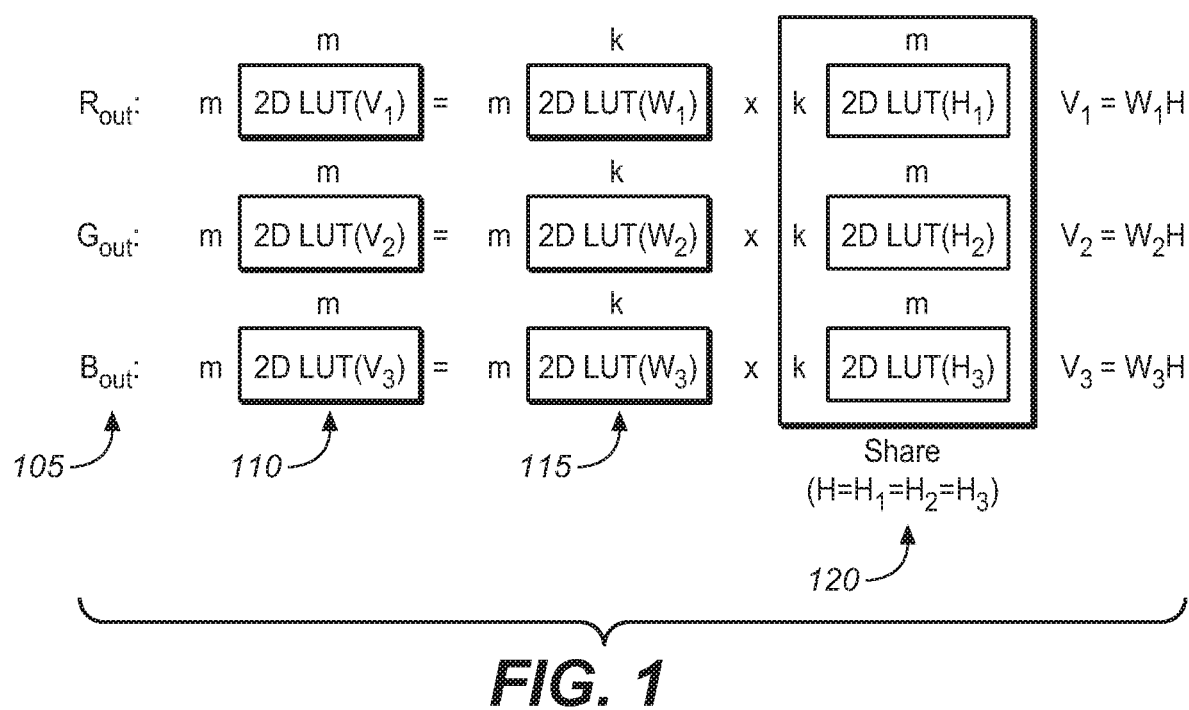
FIG. 1 illustrates the 2D LUT reduction based on two separable LUTs.

In a first aspect of the disclosure, a method is described, the method comprising: providing, by a computer, a first, second, and third look up table (LUT) for a first, second, and third color channel, the first, second and third LUTs having m by m dimensionality, wherein m is an integer; reducing an overall memory footprint of the first, second, and third LUT by decomposing the first, second, and third LUTs each into two LUTs by: calculating, by the computer, a fourth, fifth, and sixth LUT for the first, second and third color channels, the fourth, fifth, and sixth LUTs having m by k dimensionality, wherein k is an integer smaller than m; and calculating, by the computer, a seventh LUT having k by m dimensionality, wherein the first LUT is approximated by multiplying the fourth LUT by the seventh LUT, the second LUTs is approximated by multiplying the fifth LUT by the seventh LUT, the third LUTs is approximated by multiplying the sixth LUT by the seventh LUT, and an overall memory footprint for the fourth, fifth, sixth and seventh LUTs is less than the overall memory footprint of the first, second, and third LUTs; and applying a color transform from a first color space comprising the first, second, and third color channel, to a second color space based on the reducing the overall memory footprint of the first, second, and third LUT.

In a second aspect of the disclosure, a method is described, the method comprising: providing, by a computer, a first, second, and third look up table (LUT) for a first, second, and third color channel; reducing an overall memory footprint of the first, second, and third LUT by: transforming, by the computer, the first, second, and third LUT into a fourth, fifth, and sixth LUT in a frequency domain; vectorizing, by the computer, fourth, fifth, and sixth LUT by zigzag scanning; selecting L coefficients from the vectorized fourth, fifth, and sixth LUT, wherein L is an integer; calculating, by the computer, a seventh, eighth, and ninth LUT from the vectorized fourth, fifth, and sixth LUT, by inverse zigzag scanning; applying an inverse frequency domain transform to the seventh, eighth, and ninth LUT; approximating the first, second, and third LUT by the inverse frequency domain transformed seventh, eighth, and ninth LUT; calculating a color metric difference from the first, second, and third LUT and the inverse frequency domain transformed seventh, eighth, and ninth LUT, based on a spectral reflectance database; and if the color metric difference is greater than a threshold, increasing L and iterating the previous steps; and applying a color transform from a first color space, comprising the first, second, and third color channel, to a second color space based on the reducing the overall memory footprint of the first, second, and third LUT.

In a third aspect of the disclosure, a method is described, the method comprising: providing, by a computer, a first, second, and third look up table (LUT) for a first, second, and third color channel; reducing an overall memory footprint of the first, second, and third LUT by subsampling the first, second, and third LUT by: dividing, by the computer, the first, second, and third LUT into zones; for each zone, calculating a set of polynomial coefficients for intra-zone approximations; for each zone, interpolating the zone based on its set of polynomial coefficients; and applying a color transform from a first color space comprising the first, second, and third color channel, to a second color space based on the subsampled first, second, and third LUT.

In a fourth aspect of the disclosure, a method is described, the method comprising: providing, by a computer, a first, second, and third look up table (LUT) for a first, second, and third color channel; reducing an overall memory footprint of the first, second, and third LUT by approximating the first, second, and third LUT by: generating, by the computer, a hierarchy of levels for the first, second, and third LUT; dividing, by the computer, each level into merge bitmap zones; calculating for each merge bitmap zone a zero or one value; if a merge bitmap value is zero, increasing one level and analyzing the merge bitmap values at the increased level; and if a merge bitmap value is one, accessing a storage pool associated with that merge bitmap and approximating that merge bitmap based on its associated storage pool; and applying a color transform from a first color space comprising the first, second, and third color channel, to a second color space based on the reducing the overall memory footprint of the first, second, and third LUT.

In a fifth aspect of the disclosure, a still or video camera comprising an image signal processor and a memory is described, the image signal processor configured to perform the following steps: providing, by the image signal processor, a first, second, and third look up table (LUT) for a first, second, and third color channel, the first, second and third LUTs having m by m dimensionality, wherein m is an integer; reducing an overall memory footprint of the first, second, and third LUT by decomposing the first, second, and third LUTs each into two LUTs by: calculating, by the image signal processor, a fourth, fifth, and sixth LUT for the first, second and third color channels, the fourth, fifth, and sixth LUTs having m by k dimensionality, wherein k is an integer smaller than m; and calculating, by the image signal processor, a seventh LUT having k by m dimensionality, wherein the first LUT is approximated by multiplying the fourth LUT by the seventh LUT, the second LUTs is approximated by multiplying the fifth LUT by the seventh LUT, the third LUTs is approximated by multiplying the sixth LUT by the seventh LUT, and an overall memory footprint for the fourth, fifth, sixth and seventh LUTs is less than the overall memory footprint of the first, second, and third LUTs; and applying a color transform from a first color space comprising the first, second, and third color channel, to a second color space based on the reducing the overall memory footprint of the first, second, and third LUT.

In a sixth aspect of the disclosure, a still or video camera comprising an image signal processor and a memory is described, the image signal processor configured to perform the following steps: providing, by the image signal processor, a first, second, and third look up table (LUT) for a first, second, and third color channel; reducing an overall memory footprint of the first, second, and third LUT by: transforming, by the image signal processor, the first, second, and third LUT into a fourth, fifth, and sixth LUT in a frequency domain; vectorizing, by the image signal processor, fourth, fifth, and sixth LUT by zigzag scanning; selecting L coefficients from the vectorized fourth, fifth, and sixth LUT, wherein L is an integer; calculating, by the image signal processor, a seventh, eighth, and ninth LUT from the vectorized fourth, fifth, and sixth LUT, by inverse zigzag scanning; applying an inverse frequency domain transform to the seventh, eighth, and ninth LUT; approximating the first, second, and third LUT by the inverse frequency domain transformed seventh, eighth, and ninth LUT; calculating a color metric difference from the first, second, and third LUT and the inverse frequency domain transformed seventh, eighth, and ninth LUT, based on a spectral reflectance database; and if the color metric difference is greater than a threshold, increasing L and iterating the previous steps; and applying a color transform from a first color space, comprising the first, second, and third color channel, to a second color space based on the reducing the overall memory footprint of the first, second, and third LUT.

In a seventh aspect of the disclosure, a still or video camera comprising an image signal processor and a memory is described, the image signal processor configured to perform the following steps: providing, by the image signal processor, a first, second, and third look up table (LUT) for a first, second, and third color channel; reducing an overall memory footprint of the first, second, and third LUT by subsampling the first, second, and third LUT by: dividing, by the image signal processor, the first, second, and third LUT into zones; for each zone, calculating a set of polynomial coefficients for intra-zone approximations; for each zone, interpolating the zone based on its set of polynomial coefficients; and applying a color transform from a first color space comprising the first, second, and third color channel, to a second color space based on the subsampled first, second, and third LUT.

In an eighth aspect of the disclosure, a still or video camera comprising an image signal processor and a memory is described, the image signal processor configured to perform the following steps: providing, by the image signal processor, a first, second, and third look up table (LUT) for a first, second, and third color channel; reducing an overall memory footprint of the first, second, and third LUT by approximating the first, second, and third LUT by: generating, by the image signal processor, a hierarchy of levels for the first, second, and third LUT; dividing, by the image signal processor, each level into merge bitmap zones; calculating for each merge bitmap zone a zero or one value; if a merge bitmap value is zero, increasing one level and analyzing the merge bitmap values at the increased level; and if a merge bitmap value is one, accessing a storage pool associated with that merge bitmap and approximating that merge bitmap based on its associated storage pool; and applying a color transform from a first color space comprising the first, second, and third color channel, to a second color space based on the reducing the overall memory footprint of the first, second, and third LUT.

DETAILED DESCRIPTION

In the field of image and video processing, and specifically color imaging, an important function is the color transformation that maps colors between devices and color spaces (e.g., RGB/CMYK). Generally speaking, the native response of image capture devices (e.g. cameras, scanners) will not be affiliated with a color space, and thus some form of mapping will be required to transform the native signals into a well-defined colorimetric state. The most common transformation used for these purposes is the 3×3 matrix, as the coefficients are relatively easy to derive, and require only low-complexity mathematical operations. The matrix transformation, while simple in nature, can suffer from inaccuracies particularly for saturated input signals, since the Luther-Ives condition will not be satisfied in most cases. Thus, in an effort to improve accuracy throughout the input signal domain, higher-complexity transforms have introduced, and many of these are nonlinear in nature. The most common nonlinear transform found in real-time processing hardware is the three-dimensional lookup table (LUT). For an N×N×N 3D LUT, the number of lookup table elements (known as nodes) in each dimension can be relatively small (for example, N=17), and thus these tables are considered to be "sparse". For an input color sample that falls between 3D LUT nodes, interpolation will be required to approximate the LUT output—and thus errors will occur in many cases. Recently, a new approach for color transforms was proposed, and is based on two-dimensional operations. For the same memory footprint as that used for typical 3D LUTs, the 2D transforms were shown to carry a higher degree of accuracy relative to 3×3 matrices and 3D LUTs.

The present disclosure describes methods and systems that can be employed, for example, to reduce the memory footprint of two-dimensional (2D) look-up tables (LUT). An exemplary direct application would be the implementation of 2D LUTs as applied to image capture devices such as cameras or scanners; however, the same methods could be applicable to other applications, including the Dolby Vision display management pipeline.

In some embodiments, the present disclosure relates to the problem of representing 2D camera color transformations with a vastly reduced memory footprint. The methods described in the present disclosure could be used, for example, to enable 2D color transforms in most camera systems, including the mobile space.

Since wide color gamut workflows and displays have been introduced into the professional and consumer marketplace, more accurate color transformations from camera native signals can be required. To satisfy this requirement, higher complexity color transformations have become necessary in many cases, including those based on 3D lookup tables (LUTs). These transforms can represent a non-linear relationship between two different color domains more accurately than 3×3 matrices. However, 3D LUT color transforms can suffer from inaccuracies particularly between LUT nodes because of interpolation errors, and may require a higher density of nodes to achieve the desired accuracy. In fact, the node density required may exceed the memory limitations of many camera hardware platforms. Alternatively, color transforms based on 2D lookup tables can achieve a higher accuracy with a memory footprint equal to or less than that of a 3D LUT.

Various methods for color transforms based on 2D lookup tables and functions are known to the person of ordinary skill in the art. Although these methods can enable significantly higher accuracy, they still require a relatively large memory footprint. In the present disclosure, several methods for 2D LUTs memory footprint reduction are described.

The present disclosure, in some embodiments, relates to the following memory reduction methods: a) Using separable LUTs: one common LUT for all 3 color components and three smaller LUTs for the red, green and blue (R, G, and B) channels; b) DCT-like compression of 2D LUT (DCT refers to discrete cosine transforms); c) Zone-based surface approximations of LUTs; d) A hierarchical representation targeting explicitly spectral image processing (SIP) camera applications.

With regard to method a), the 2D LUTs for each channel can be, for example, separated into two separate matrices. The combined memory footprint of the two matrices (referred to as stage I and stage II) is less than that of the original larger LUTs, and the two matrices can be chosen to minimize the color errors in the transformation. While, in some embodiments, the stage I matrices are unique to the R,G,B channels, the stage II matrix is common to all three color channels.

With regard to method b) for DCT-like compression, modern codecs (such as AVC and HEVC) use integer approximations of the DCT, therefore the methods of the present disclosure can be applied with such variations as well.

2D LUT Reduction Based on Two Separable 2D LUTs

A first method comprises a 2D LUT reduction based on two separable 2D LUTs. FIG. 1 illustrates the 2D LUT reduction based on two separable LUTs. In this example, the RGB color space is used (105), but in other embodiments other color spaces and channels may be used. The original (larger) 2D LUT (110) can be approximated with two smaller 2D LUTs (115, 120) and the memory footprint can be reduced, provided the total size of the two small 2D LUTs is smaller than that of the original 2D LUT. From FIG. 1, two "stages" are applied to approximate the original m by m LUT (110), with the first stage involving an m by k matrix (115) and the second incorporating a k by m matrix (120), with k≤m.

In an embodiment, the second stage 2D LUT (120) is common for all color channels ($R_{out}$, $G_{out}$, $B_{out}$). Therefore, while the first stage matrices are different for each color channel, the second stage matrix is the same for each color channel. Having a common second stage LUT significantly reduces the memory footprint required to store the entire separated matrix system.

For generating two smaller 2D LUTs from the original 2D LUT, the method of matrix factorization can be used; with this method, the 2D LUT is considered as a 2D matrix. Therefore, $V_1$, $V_2$ and $V_3$ indicate the original 2D LUT of $R_{out}$, $G_{out}$ and $B_{out}$ respectively. The respective first second stage matrices for the three color channels can be termed $W_1$, $W_2$ and $W_3$ and indicate the factorized 2D LUT of $R_{out}$, $G_{out}$ and $B_{out}$ respectively. H indicates one common "stage 2" 2D LUT for all the three color channels. With the above notation, then $V_1$ can be approximated by $W_1$ H, $V_2$ can be approximated by $W_2$ H and $V_3$ can be approximated by $W_3$ H. The challenge is to choose $W_i$ and H such that the reconstruction error is minimized.

In this example, the matrix factorization steps can be summarized as follows:

1) Given $V_1$, $V_2$ and $V_3$, generate matrix V as $$V = \begin{bmatrix} V_1 \\ V_2 \\ V_3 \end{bmatrix}$$

2) Find matrices W and H by minimizing the following cost function $$\operatorname*{argmin}_{W,H} \| V - WH \|^2 + \lambda_1 \| W \|^2 + \lambda_2 \| H \|^2$$

where $$W = \begin{bmatrix} W_1 \\ W_2 \\ W_3 \end{bmatrix},$$

and $\lambda_1$ and $\lambda_2$ are regularization parameters.

It will be appreciated that the cost function is a measure of an extent of difference between V and WH, and the goal is to minimize this measure. Example alternative cost functions include, but are not limited to, the use of L1 regularization terms, $$\operatorname*{argmin}_{W,H} \| V - WH \|^2 + \lambda_1 \| W \| + \lambda_2 \| H \|$$

In some embodiments, the minimization of the cost function is based on the alternating least square (ALS) optimization method. Example alternative optimization methods include nonlinear techniques such as the Levenburg-Marquardt algorithm or genetic programming.

Example alternative matrix factorization methods include block LU decomposition or QR decomposition.

The reduction of the memory footprint is described in the following. In a first step, the size of $V_i$, $W_i$ and H are [m×m], [m×k] and [k×m] respectively, and i=1, 2, 3. The total size of the LUTs ($V_1$, $V_2$, $V_3$) for the original color transform is therefore 3 $m^2$, and the total size of the LUTs ($W_1$, $W_2$, $W_3$, H) is 4mk. If k satisfies 4mk<3 $m^2$ with similar accuracy, a reduction in memory footprint has been achieved.

In an alternative embodiment, there is a common first stage matrix W and respective second stage matrices $H_1$, $H_2$ and $H_3$ for the three color channels. The total size of the LUTs (W, $H_1$, $H_2$, $H_3$) is 4mk. If k satisfies $4mk < 3 m^2$ with similar accuracy, a reduction in memory footprint has been achieved.

In an alternative embodiment, there are respective first stage matrices $W_1$, $W_2$ and $W_3$ and respective second stage matrices $H_1$, $H_2$ and $H_3$ for the three color channels. The total size of the LUTs ($W_1$, $W_2$, $W_3$, $H_1$, $H_2$, $H_3$) is 6mk. If k satisfies $6mk < 3 m^2$ with similar accuracy, a reduction in memory footprint has been achieved.

It will be appreciated that, in various embodiments, any one, any two or all three of the color transform LUTs (e.g., $V_1$, $V_2$, $V_3$) can be replaced by a respective pair of smaller matrices consisting of an m×k matrix and a k×m matrix as described above. In an embodiment where exactly one of the color transform LUTs is so replaced: if 2mk is equal to $m^2$ then there is no memory-footprint penalty associated with the replacement; and if 2mk is less than $m^2$ then there is a memory-footprint saving associated with the replacement. In an embodiment where exactly two of the color transform LUTs are so replaced, and the replacement pairs of small matrices share either a common m×k matrix or a common k×m matrix: if 3mk is equal to $2 m^2$ then there is no memory-footprint penalty associated with the replacement; and if 3mk is less than $2 m^2$ then there is a memory-footprint saving associated with the replacement. In an embodiment where all three of the color transform LUTs are so replaced, and the replacement pairs of small matrices share either a single common m×k matrix or a single common k×m matrix: if 4mk is equal to $3 m^2$ then there is no memory-footprint penalty associated with the replacement; and if 4mk is less than $3 m^2$ then (as noted above) there is a memory-footprint saving associated with the replacement.

Figure 2:
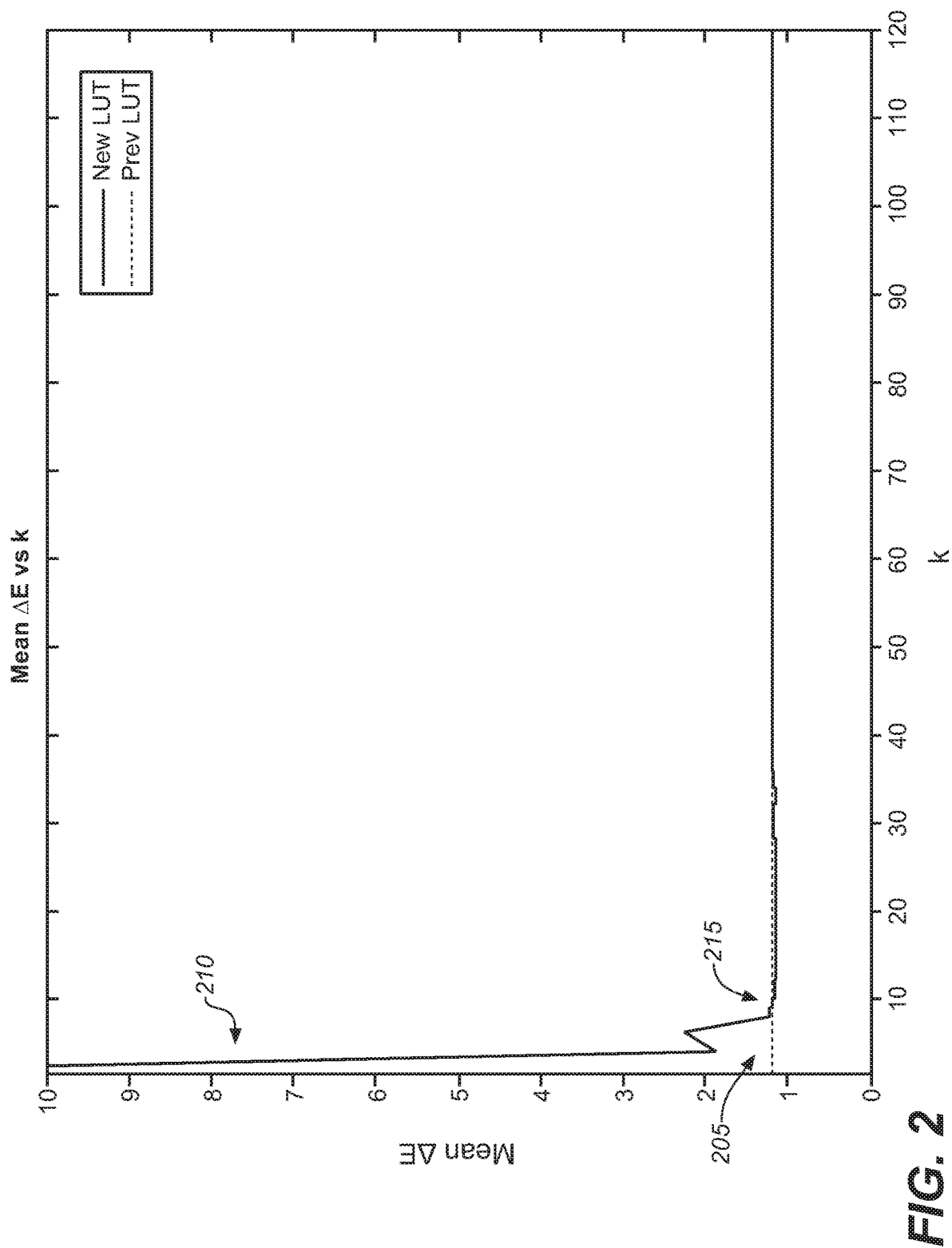
FIG. 2 shows an example of experimental results for memory footprint reduction.

FIG. 2 shows an example of experimental results, with an exemplary quantitative estimate of how much the method described above can reduce the memory required for the LUT representation. Plotted on the y axis is the average CIE 1976 color error metric ($\Delta E_{1976}$) for the color transform and on the x axis, k is plotted. This plot shows that it is possible to approximate the original m by m LUT using two small LUTs with a relatively small k. Specifically, the LUT prepared with the method described above has a higher average color metric (210) compared to the LUT prepared without the matrices separation method described above (205).

In this exemplary experiment m=525 was used and the smallest k achieving similar accuracy relative to the original 2D LUT method was 8 ($\Delta E_{1976}$=1.19 for the original LUT and $\Delta E_{1976}$=1.25 for its reconstruction using this method). This point of similar accuracy is indicated in FIG. 2 as (215). At point (215), with m=525 and k=8, the reduction rate will be $4mk/3 m^2$, or about 0.02.

Example measures which could be used instead of the average color error metric ($\Delta E_{1976}$) include the CIE 1994 color error metric ($\Delta E_{1994}$), and the CIE 2000 color error metric ($\Delta E_{2000}$).

While the LUT separation method described above can significantly reduce the memory required to store the LUT itself, it can also increase the computational complexity. To access the same element of the original 2D LUT using the two 2D LUTs, the LUT separation method requires the vector multiplication between one row vector in the first LUT and one column vector in the second LUT. However, since the length of each vector can be k=8, according to the graph of FIG. 2, then the length of the vector can be considered very small in some embodiments, and therefore the increased computational complexity can be negligible in a hardware implementation. In this example, only 8 multiplications and 7 summations would need to be performed. Implementation of this computational load using parallel logic can therefore be straightforward in an FPGA.

Figure 3:
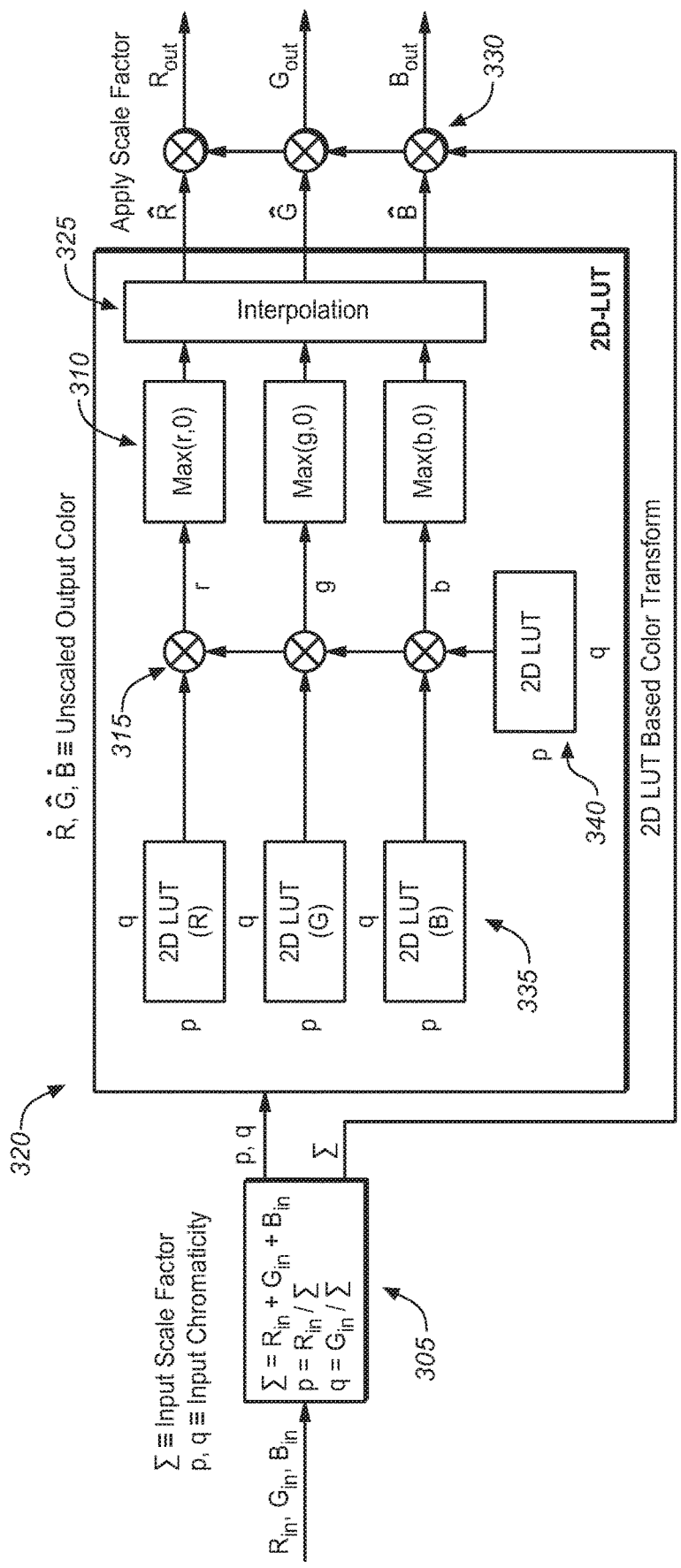
FIG. 3 illustrates a block diagram of the color transformation with two separable 2D LUTs.

The overall block diagram of the color transform with two separable 2D LUTs is illustrated in FIG. 3. FIG. 3 shows how the methods of the present disclosure can be combined with other color transform systems known to the person of ordinary skill in the art, and how one input color can be transformed with the systems of the present disclosure.

In FIG. 3, the input color channels, for example for R, G and B, are applied to obtain an input scale factor $\Sigma$ (the sum of the three color channels) and two input chromaticity parameters, p and q (305). In the present embodiments, each of the input color channels R, G and B comprises a data in floating point or fixed point (integer) format; the data can be represented in interleaved form (e.g. RGBRGB) or separated into individual R, G, B planes.

A first input chromaticity parameter is calculated by dividing a first channel by the input scale factor, for example, the red channel divided by the input scale factor. The second input chromaticity is calculated by dividing a second channel by the input scale factor, for example, the green channel divided by the input scale factor.

The LUT-based color transform (320) is carried out by multiplying vectors as described above for the 2D LUT reduction based on two separable LUTs. More specifically, in the present embodiment, this involves obtaining the input chromaticity parameters p and q, using one of them as an index to retrieve respective rows of k values from the three m×k stage one matrices, and using the other one of them as an index to retrieve a column of k values from the k×m stage two matrix. Then, vector multiplication is used to compute respective single values for the three color channels R, G and B, from the three rows of k values and the column of k values. The three single values are output as intermediate values suitable for obtaining respective unscaled output colour channel value corresponding to the R, G and B colour channels.

Without loss of generality, it is noted that in the present embodiment $0 \le p \le 1$ and p is mapped to an integer in the range 1 to m which is the index used to retrieve the respective rows of k values from the three m×k stage one matrices. Similarly, in the present embodiment $0 \le q \le 1$, and q is mapped to an integer in the range 1 to k which is the index used to retrieve a column of k values from the k×m stage two matrix.

Since it is possible for the output value of two vector multiplications (315, from the factorized 2D LUTs) to be negative in the systems described herein, in the present embodiment negative intermediate values will be clipped to zero (310) after the multiplication (315).

After any clipping (310), in the present embodiment the intermediate values are interpolated (325), to produce the three unscaled output colour channel values.

After interpolation (325), in the present embodiment the three unscaled color channels are multiplied (330) by the input scale factor to obtain the three final output color channel values corresponding to the R, G and B colour channels.

In the embodiment shown in FIG. 3, and described above, the first stage LUTs are different for each of the three color channels R, G and B (335), while the second stage LUT (340) is the same for the three color channels R, G and B. In an alternative embodiment, the first stage LUT is the same for the three color channels RGB and the second stage LUTs are different for each of the three color channels RGB. In a further alternative embodiment, the first stage LUTs are different for each of the three color channels RGB and the second stage a LUTs are different for each of the three color channels RGB.

DCT-Like Compression of the 2D LUT

The second method of the present disclosure involves a DCT-like compression of the 2D LUT. An underlying concept of this method is that the original 2D LUT can be thought of as a smooth image. As visualized in FIG. 4, the original m by m 2D LUTs have a very smooth appearance, and most spatial-frequency domain energy of the 2D LUTs will be carried in a small number of frequency-domain coefficients. If the 2D LUTs are represented in the frequency domain using DFT (Discrete Fourier Transform), DCT (Discrete Cosine Transform), or DST (Discrete Sine Transform), the 2D LUTs can be reproduced using the small number coefficients of DFT, DCT, or DST. Since the DCT is widely used in JPEG and H.264, which are standard image/video codecs implemented in camera image signal processor (ISP) modules, DCT was chosen for discussion here, as an example. However, other transform can also be used, for example as those listed above.

The compression steps using 2D DCT (for the DCT example) can be summarized as follows:

1) The original 2D LUT ($C_{pq}$) is transformed into $F_{uv}$ in the frequency domain using the following equation (the person of ordinary skill in the art will notice the following equations are for DCT transforms, and other equations may be used for other transforms)

$$F_{uv} = a_u a_v \sum_{p=0}^{M-1} \sum_{q=0}^{N-1} C_{pq} \cos\frac{\pi(2p+1)u}{2M} \cos\frac{\pi(2q+1)v}{2N}$$

$$\text{for } 0 \le u < M, 0 \le v < N, a_u = \begin{cases} \sqrt{\frac{1}{M}}, u = 0 \\ \sqrt{\frac{2}{M}}, u \ne 0 \end{cases}, a_v = \begin{cases} \sqrt{\frac{1}{N}}, v = 0 \\ \sqrt{\frac{2}{N}}, v \ne 0 \end{cases}$$

where p and q are the indices corresponding to the spatial domain, and (u,v) are those pertaining to the spatial frequency domain. $C_{pq}$ are the 2D LUT table entries, and $F_{uv}$ are the corresponding transform-domain coefficients.

2) Vectorize $F_{uv}$ using zigzag scanning.

3) Choose first L DCT coefficients in the vectorized $F_{uv}$.

4) Generate $\tilde{F}_{uv}$ from the L DCT coefficients using inverse zigzag scanning.

5) Inverse 2D DCT is applied to obtain the approximate 2D LUT ($\tilde{C}_{pq}$) as follows:

$$\tilde{C}_{pq} = \sum_{u=0}^{L_n-1} \sum_{v=0}^{L_n-1} a_u a_v \tilde{F}_{uv} \cos\frac{\pi(2p+1)u}{2M} \cos\frac{\pi(2q+1)v}{2N},$$

$$\text{for } 0 \le p < M, 0 \le q < N, a_u = \begin{cases} \sqrt{\frac{1}{M}}, u = 0 \\ \sqrt{\frac{2}{M}}, u \ne 0 \end{cases}, a_v = \begin{cases} \sqrt{\frac{1}{N}}, v = 0 \\ \sqrt{\frac{2}{N}}, v \ne 0 \end{cases}$$

where $L_n$ is the smallest integer satisfying $L_n \ge \sqrt{L}$.

6) Compare $\Delta E_{1976}$ computed from both $C_{pq}$ and $\tilde{C}_{pq}$ with a spectral reflectance database, and if the difference is smaller than a threshold, stop. Otherwise, increase L=L+1 and repeat steps 3) to 6).

When step 6) is completed, store the coefficients.

Figure 5:
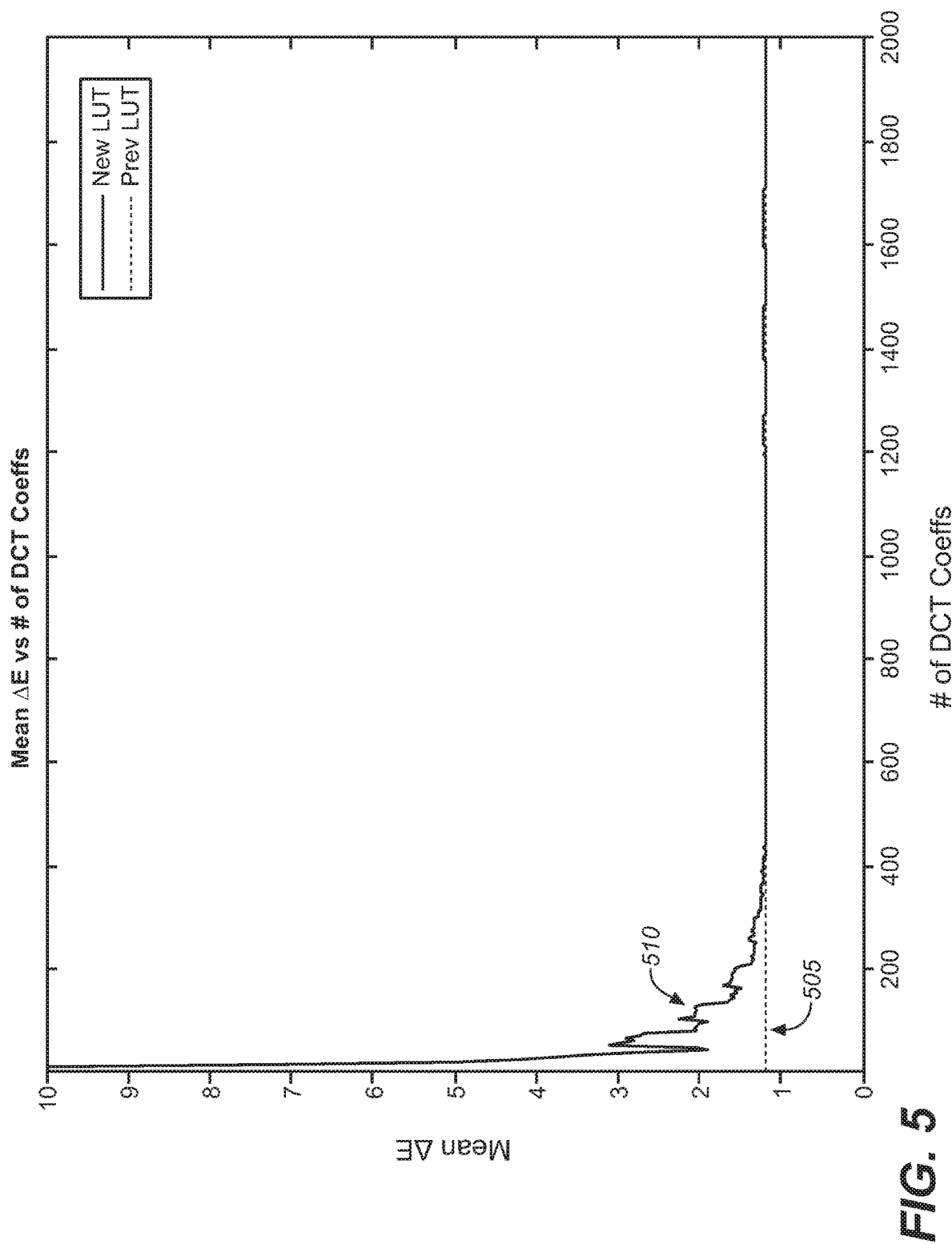
FIG. 5 illustrates a plot of mean $\Delta E_{1976}$ vs number of DCT coefficients used.

Shown in FIG. 5 is a plot representing the relationship between average color metric ($\Delta E_{1976}$) vs the number of DCT coefficients L. FIG. 5 demonstrates that it is possible to approximate the original m by m LUT using a very small number L of DCT coefficients, approximately 300 in this example. In FIG. 5, the average color metric is plotted for the original LUT (505) as well as for the compressed LUT using the compression method described above (510).

In the experiment of FIG. 5, a 525 by 525 original LUT was used and the LUT was reconstructed with 300 DCT coefficients. ($\Delta E_{1976}=1.19$ for the original LUT and $\Delta E_{1976}=1.27$ for the method described above). Therefore, the reduction rate will be $300/525^2$ or about 0.001.

As the person of ordinary skill in the art will understand, the above equations and methods steps can be modified to use other transforms, instead of DCT. Additionally, $\Delta E_{1976}$ is used as an example to calculate the color difference metric, but other methods may be applied.

Figure 6:
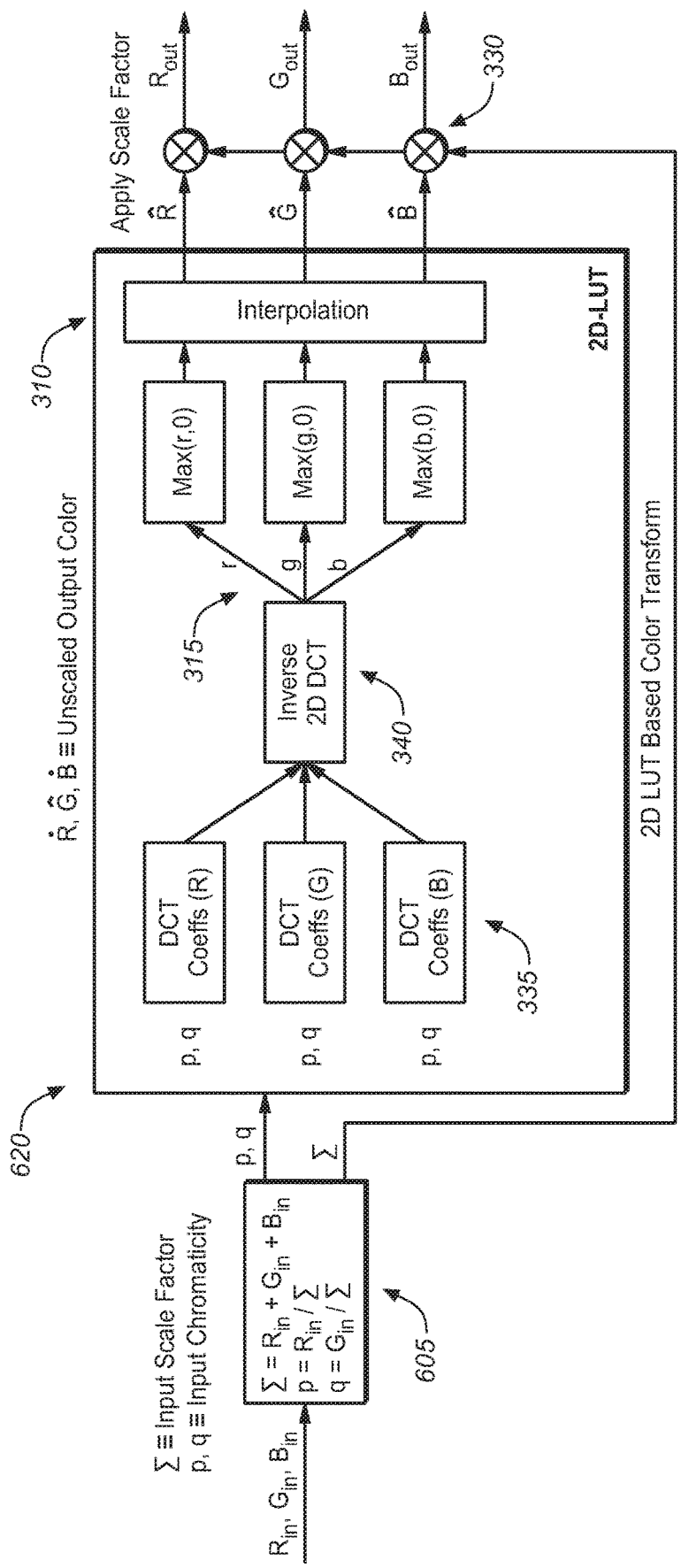
FIG. 6 illustrates an exemplary block diagram of the color transform with a DCT-like compression of the 2D LUT.

An exemplary block diagram of the color transform with a DCT-like compression of the 2D LUT is illustrated in FIG. 6. FIG. 6 shows how the proposed method can be combined with color transform systems known to the person skilled in the art. Since it is possible for the output value of the inverse 2D DCT (from the 2D LUT in frequency domain) to be negative in the proposed system, negative values will be clipped to zero after the inversion.

In FIG. 6, the input color channels, for example for R, G and B, are applied to obtain an input scale factor Σ (the sum of the three color channels) and two input chromaticity parameters, p and q (605). A first input chromaticity is calculated by dividing a first channel by the input scale factor, for example, the red channel divided by the input scale factor. The second input chromaticity is calculated by dividing a second channel by the input scale factor, for example, the green channel divided by the input scale factor. The DCT-like compression (620) is carried out by the steps described above. The DCT coefficients for each channel are chosen (335), followed by the inverted DCT (340). Since it is possible for the output values of the inverse 2D DCT (315, from the 2D LUT in frequency domain) to be negative in the systems described herein, negative values will be clipped to zero (310) after the inversion (340).

After interpolation (310), the three unscaled color channels are multiplied (330) by the input scale factor to obtain the three final output color channels.

Zone-Based Surface Approximations

Figure 4:
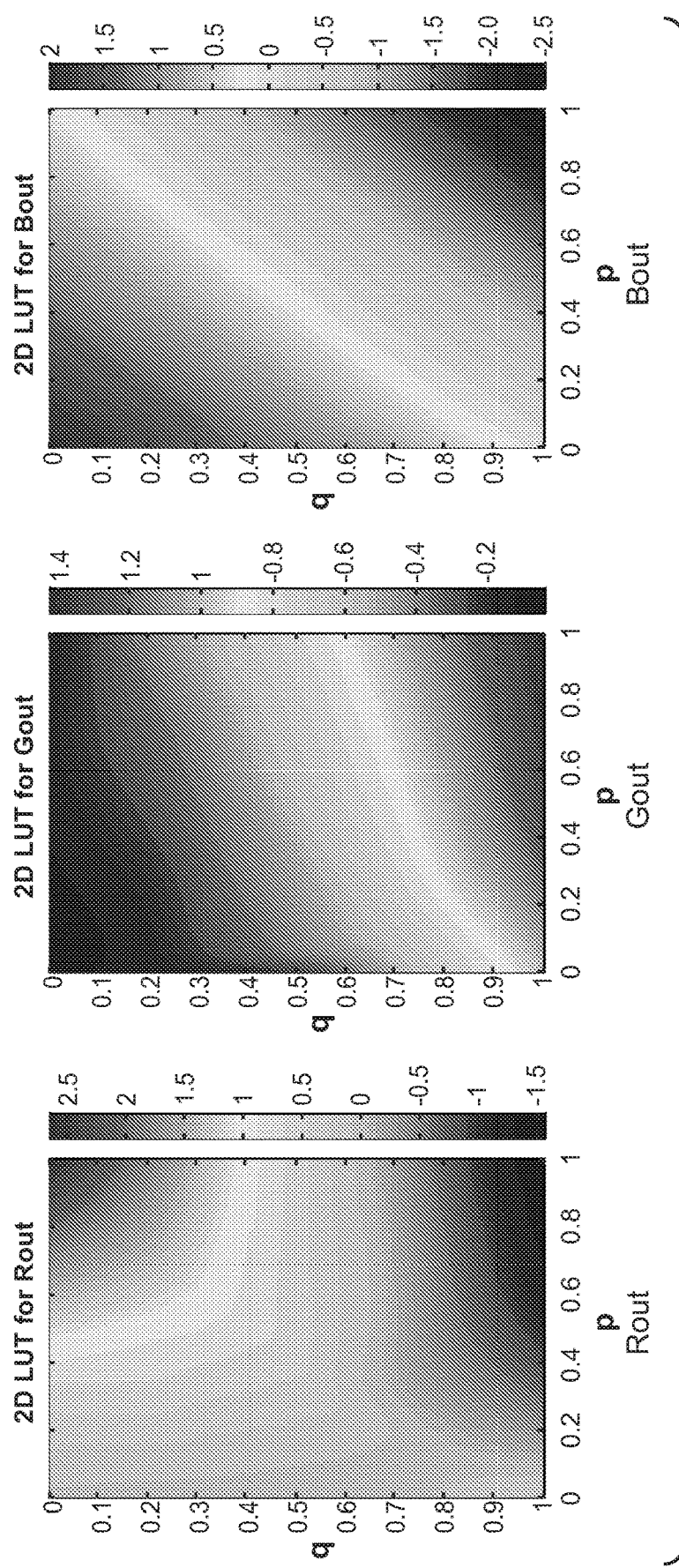
FIG. 4 illustrates a visualization of original m by m 2D LUTs.

From FIG. 4, it can be noted that the [m×m] 2D LUTs form smooth surfaces, and in general these are not truly planar in nature (unless the Luther-Ives condition is satisfied). However, it is possible to consider a subsampled LUT by a factor r>1 which would result in a smaller LUT with dimension [m/r×m/r]. Each node in the new LUT could be approximated locally by a plane using a simple Taylor expansion. For example, for the R channel the Taylor expansion can be written as:

$$R_{LUT}(l, m) \approx R_{LUT}^0(l, m) + \frac{\partial R_{LUT}}{\partial p}\Delta p + \frac{\partial R_{LUT}}{\partial q}\Delta q$$

where $R_{LUT}(l, m)$ is the node in the new LUT, $R_{LUT}^o(l, m)$ is the offset of the plane at the node, and the first order derivatives $$\left(\frac{\partial R_{LUT}}{\partial p}, \frac{\partial R_{LUT}}{\partial q}\right)$$

of the LUT surface with respect to the input coordinates (p,q) are computed at the node point (l,m); $\Delta p$ and $\Delta q$ represent the distance from the node point. The person of ordinary skill in the art will understand that similar Taylor expansions can be calculated for other color channels.

For approximating the R LUT surface for an arbitrary (p,q) pair, it is possible to use simple bilinear interpolation, for example. As such, the four nearest nodes in the subsampled LUT could be determined as:

$$R_{LUT}(l,m), R_{LUT}(l+1,m), R_{LUT}(l,m+1), R_{LUT}(l+1,m+1)$$

The approximated R LUT value would then be:

$$R_{LUT}(p, q) \approx$$
$$R_{LUT}^o(l, m)(1 - \Delta p/S)(1 - \Delta q/S) + R_{LUT}^o(l+1, m)(\Delta p/S)(1 - \Delta q/S) +$$
$$R_{LUT}^o(l, m+1)(1 - \Delta p/S)(\Delta q/S) + R_{LUT}^o(l+1, m+1)(\Delta p/S)(\Delta q/S) +$$
$$S\frac{\partial R_{LUT}}{\partial p}(l, m)(\Delta p/S)(1 - \Delta p/S)(1 - \Delta q/S) +$$
$$S\frac{\partial R_{LUT}}{\partial q}(l, m)(\Delta q/S)(1 - \Delta p/S)(1 - \Delta q/S) +$$
$$S\frac{\partial R_{LUT}}{\partial p}(l+1, m)(1 - \Delta p/S)(\Delta p/S)(1 - \Delta q/S) +$$
$$S\frac{\partial R_{LUT}}{\partial q}(l+1, m)(\Delta q/S)(\Delta p/S)(1 - \Delta q/S) +$$
$$S\frac{\partial R_{LUT}}{\partial p}(l, m+1)(\Delta p/S)(1 - \Delta p/S)(\Delta q/S) +$$
$$S\frac{\partial R_{LUT}}{\partial q}(l, m+1)(1 - \Delta q/S)(1 - \Delta p/S)(\Delta q/S) +$$
$$S\frac{\partial R_{LUT}}{\partial p}(l+1, m+1)(1 - \Delta p/S)(\Delta p/S)(\Delta q/S) +$$
$$S\frac{\partial R_{LUT}}{\partial q}(l+1, m+1)(1 - \Delta q/S)(\Delta p/S)(\Delta q/S)$$

where S is the distance (in p,q space) between the nodes in the subsampled LUT. The first four terms in the above expression are the standard components for bilinear interpolation that preserve surface continuity; the remaining terms will enforce continuity of the first order surface derivatives at the zone boundaries. If terms involving orders of $\Delta p$ and $\Delta q$ are grouped (e.g. $\Delta p^2 \Delta q$) then the above expression can be reduced to polynomial form with a total of 8 terms. Thus for each zone, these 8 terms need to be stored, and a reduction in memory footprint would be realized provided the LUT subsampling factor r satisfies $r^2 \geq 8$ ($m^2 \geq 8(m/r)^2$). As with the methods described above with regard to the 2D LUT reduction based on two separable 2D LUTs and the DCT-like compression of the 2D LUT, there would be a tradeoff between the amount of subsampling and accuracy relative to the initial LUT. Furthermore, there is an additional computational burden placed on the system that requires the polynomial terms to be computed and subsequently multiplied by the zone coefficients.

Hierarchical Representation of the 2D LUT

Figure 7:
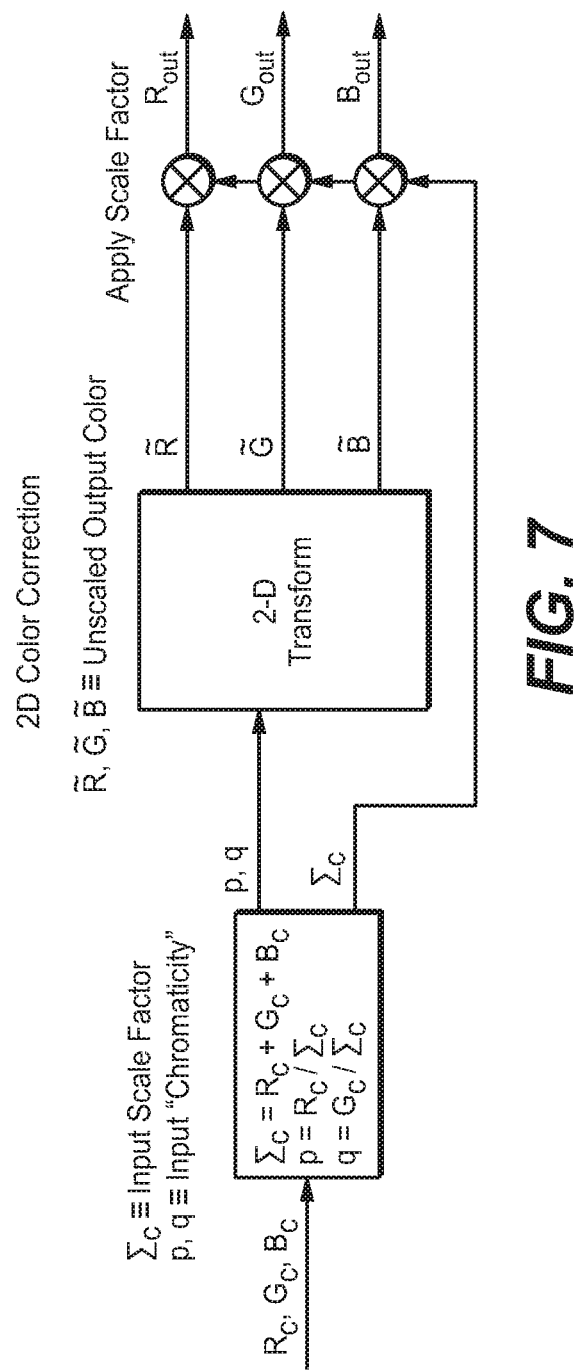
FIG. 7 illustrates a block diagram of a general 2D LUT-based color transform.

As an example, the hierarchical representation method can be applied to a 513×513 2D lookup table used for color transforms. FIG. 7 illustrates the general process by which incoming signals ($R_c, G_c, B_c$) are transformed into the destination signals ($R_{out}, G_{out}, B_{out}$) via the 2D LUT. FIGS. 3 and 6 illustrate two examples of how the 2D transform can be carried out, as described above. The native "chromaticity" values (p,q) are used to index into the 2D LUT, and the result of the operation is multiplied by the factor $\Sigma$ to achieve radiometric scaling. A 2D transform (typically in the form of a LUT) is used to approximate the color surface of the training set.

Figure 8:
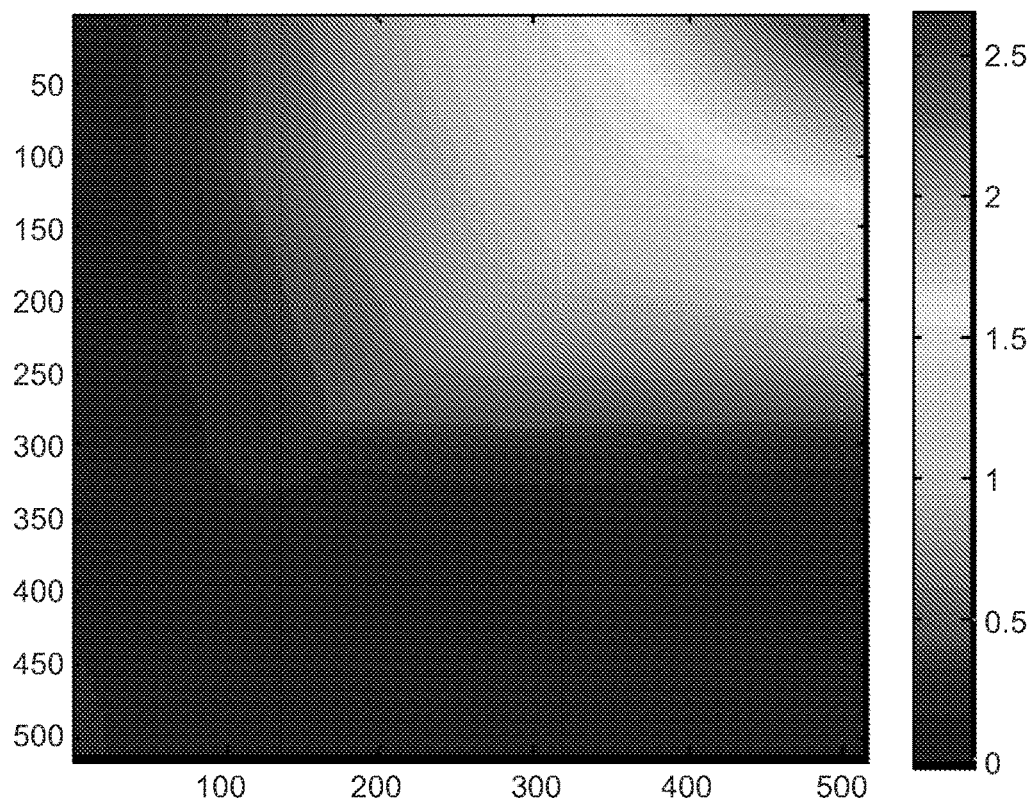
FIGS. 8-9 illustrate an example set of 2D LUTs for the R,G,B channels.
Figure 8:
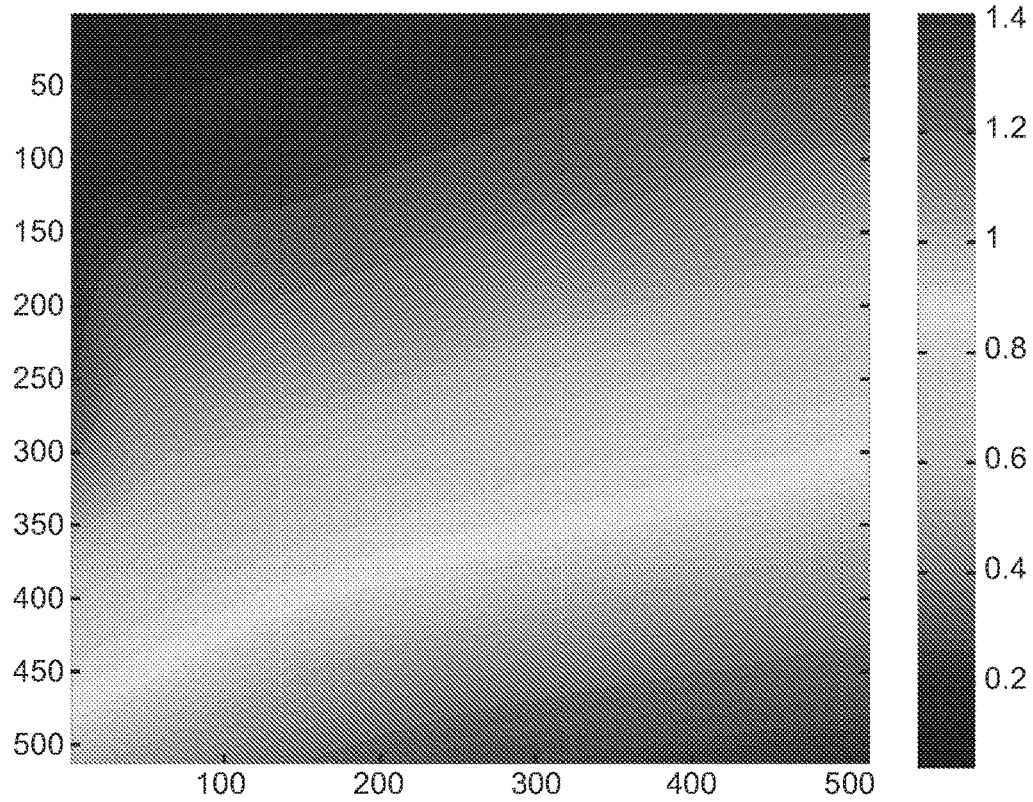
Figure 9:
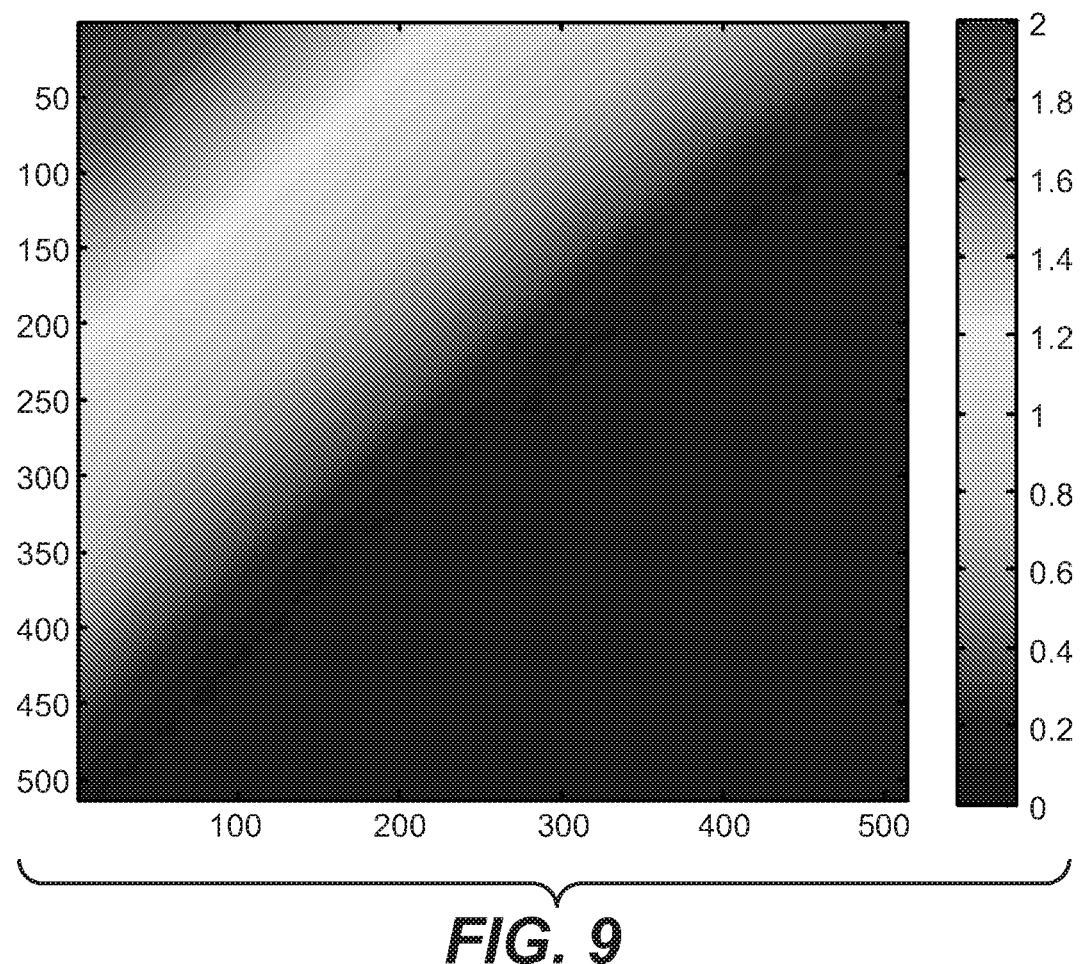

An example set of 2D LUTs for the R,G,B channels is shown in FIGS. 8-9. In this example the table consists of 513×513 nodes. Assuming double precision data representation, this configuration would require 513×513×8×3, that is about 6 Mbytes, which would likely be excessive for most in-camera hardware ISPs. From FIGS. 8-9, it can be observed that the LUT surfaces are smooth with very shallow gradients in some areas. Therefore, the 2D LUTs can be highly compressed for example through one of the methods described in the present disclosure above.

Another method to achieve data reduction comprises the creation of a hierarchical indexing and storage mechanism for the 2D LUT, such that the amount of data required for its representation is vastly reduced. This approach is based on two complementary elements: a merge bitmap and a node storage memory pool. For a 513×513 2D LUT, it is possible to construct a hierarchy of levels, each with increasing resolution. In some embodiments, level 1 can be 2×2, level 2 can be 4×4, and so on until level 9 which can be 513×513. Different number of levels with different resolutions could be used, as understood by the person of ordinary skill in the art.

Figure 10A:
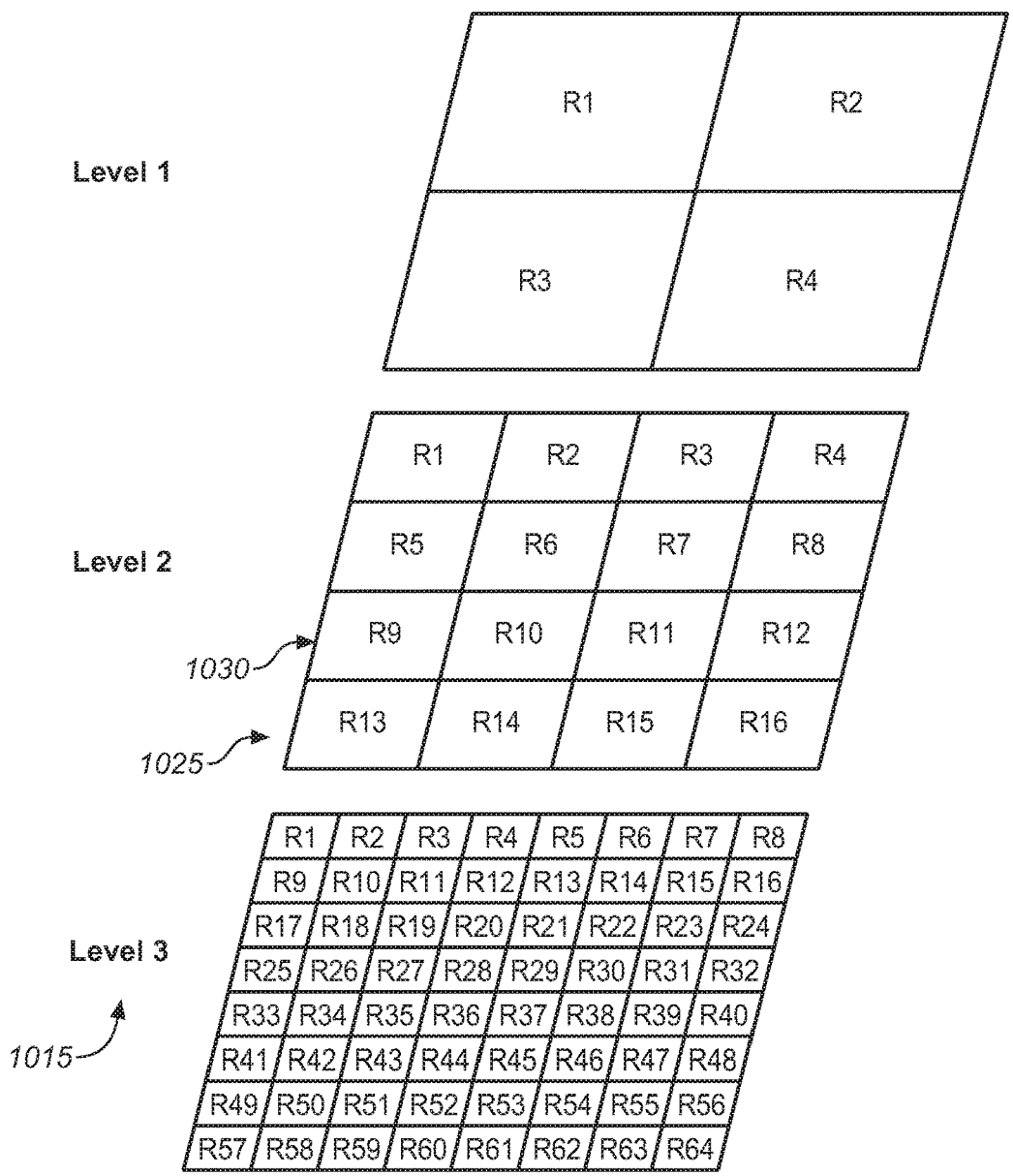
FIG. 10 illustrates an exemplary hierarchical 2D LUT representation.
Figure 10B:
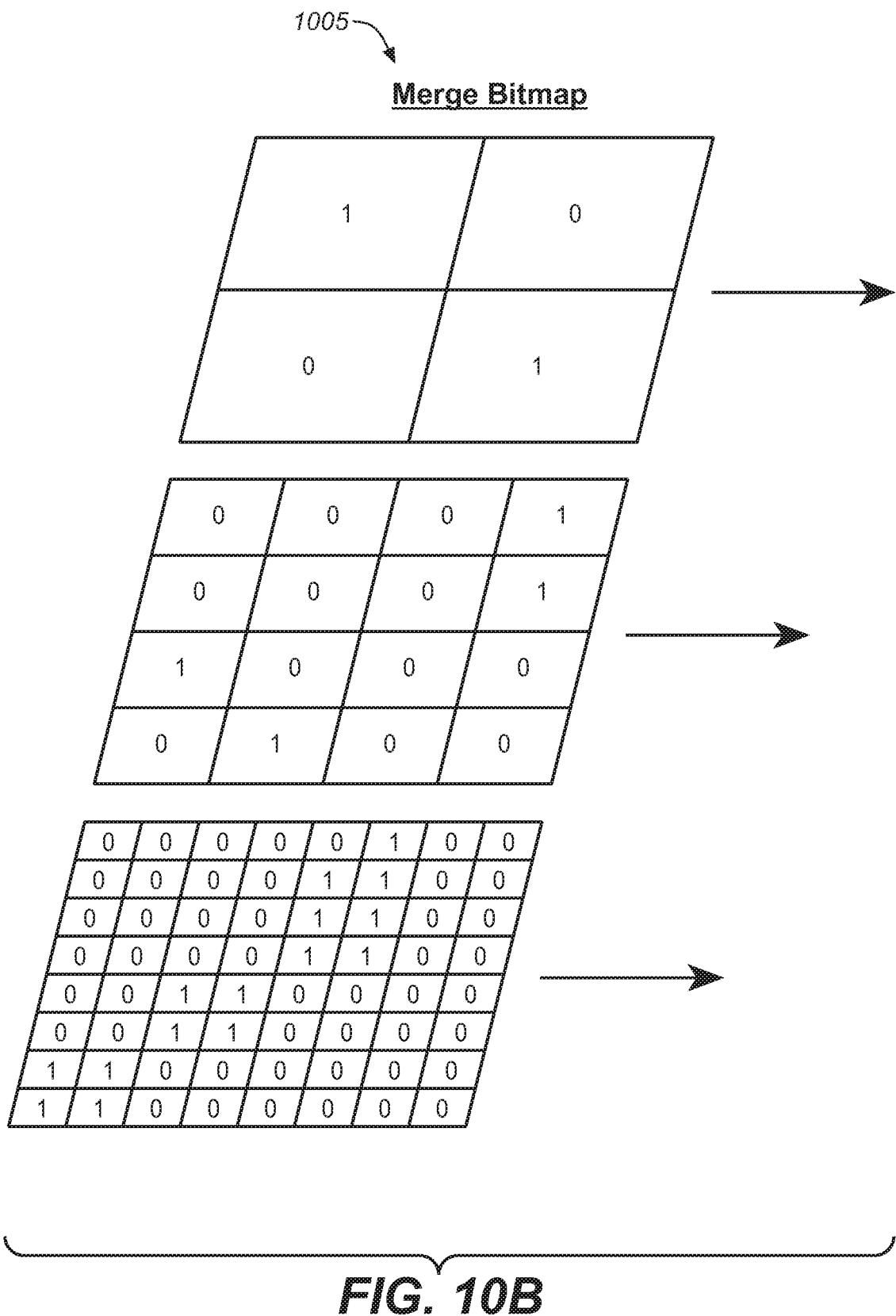
Figure 10C:
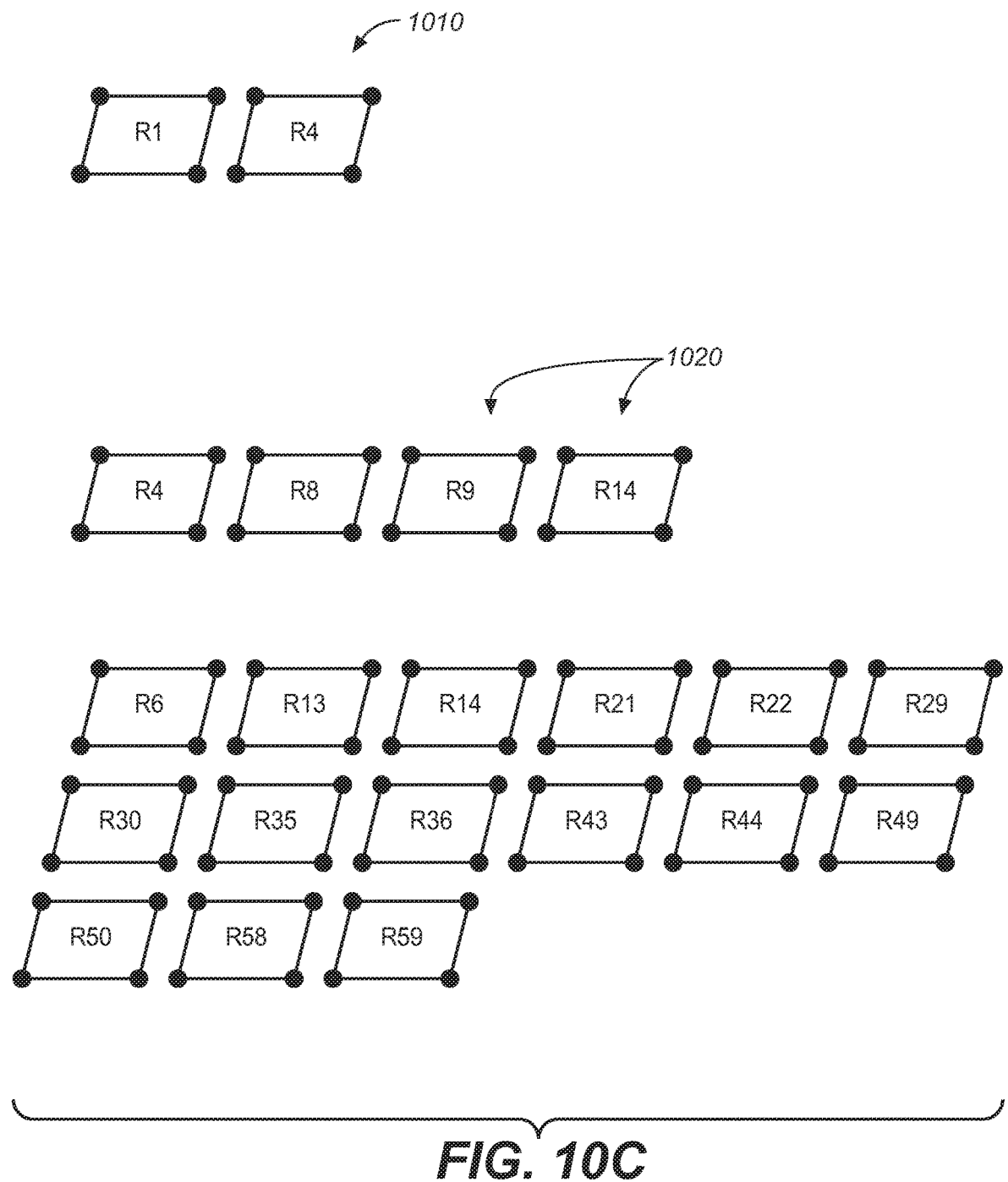

Each level can have a merge bitmap and an associated node storage pool, as depicted in FIG. 10. The merge bitmap (1005) is used to determine if the storage pool (1010) is to be used at a particular level (1015), and each storage pool element (1020) contains four nodes that can be used for bilinear interpolation in that region. In some embodiments, only regions whose bitmap value is one will have elements stored in the storage pool for that level.

For an incoming (p,q)∈[0,1), the method can start by finding the region index for level 1, $i=\text{int}[2p]$ $j=\text{int}[2q]$ If the level 1 bitmap at (i,j) is 1, then the storage pool element that corresponds to that bitmap location is accessed. The four nodes stored in that pool element are used to compute the LUT value at the requested (p,q) coordinate via bilinear interpolation. If the level 1 bitmap at (i,j) is zero, then the merge bitmap of level 2 is queried with new indices (i,j) computed:

$i=\text{int}[4p]$ $j=\text{int}[4q]$

Similarly as for level 1, if the level 2 bitmap at (i,j) is 1, the appropriate storage pool element for level 2 is accessed, and bilinear interpolation is used to compute the LUT value. If the level 2 bitmap is zero, then the process continues onto level 3. These steps will repeat if necessary until the highest resolution level is reached (level 9 in the above example).

A memory footprint reduction can be achieved if there are larger regions in the original 2D LUTs that are nearly planar, such that nodes with a large separation (in conjunction with bilinear interpolation) can be used to adequately approximate the variations of the 2D LUT surface in these regions. Using this hierarchical method, the total amount of memory (in bits) required would be:

$$mem_H = \sum_{k=1}^{N} 4 * u * N_m^k + (2^k * 2^k)$$

where the first term of the sum represents the memory required for the storage pool at each level, and the second term corresponds to the memory required for the bitmap; u is the bit depth of the node data, and $N_m^k$ is the number of elements in the k-th level storage pool.

If there are no merged regions in a particular level (entire merge map consists of zeros), the merge bitmap or nodes are not stored in the storage pool; both of these entities would be NULL, and the algorithm would automatically skip to the next level. This will have the effect of reducing the memory requirements even further.

For each level, it is important to be able to link the unity bitmap entries to storage pool entries. When the bitmap value is one for a particular level, one approach is to sum the bitmap entries for that level up to and including that entry to create an index. That index can in turn be used to determine which of the storage pool elements to access for that level. For example, in FIG. 10 it is possible to consider the case where the incoming (p,q) is positioned in the level 2 bitmap in the third row and first column of (1025). Summing the bits in the level 2 bitmap up to and including this value results in an index equal to 3, which would indicate the $3^{rd}$ element in the level 2 storage pool would be used (1030, R9 in FIG. 10). Alternatively, it is possible to use 1D lookup table accelerators for this accumulation math. For example, it is possible to have an accumulator 1D LUT associated with each row in the bitmap. This can be populated with the accumulated sum of the previous bitmap rows. For example, for the level 2 bitmap $LUT_{accum}[\text{row 1}]=0$ $LUT_{accum}[\text{row 2}]=1$ $LUT_{accum}[\text{row 3}]=2$ $LUT_{accum}[\text{row 4}]=3$ thus the storage pool index for (i,j) corresponding to the $3^{rd}$ row and $1^{st}$ column would be:

index=$LUT_{accum}$[row 3]+sum(bitmap(row 3,all columns<=1))=2+1=3

Figure 11:
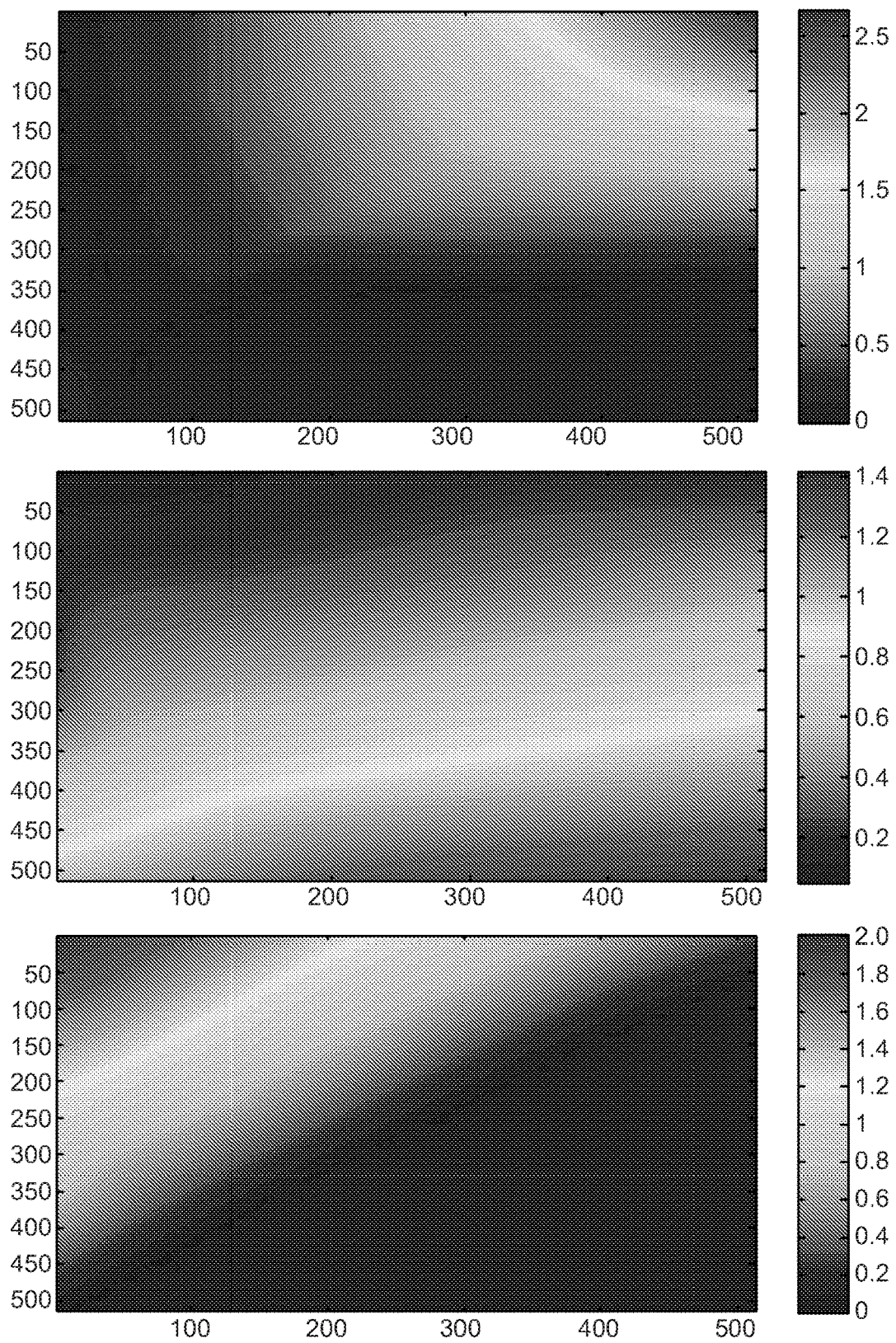
FIGS. 11-12 illustrate an example of the hierarchical 2D LUT representation.
Figure 12:
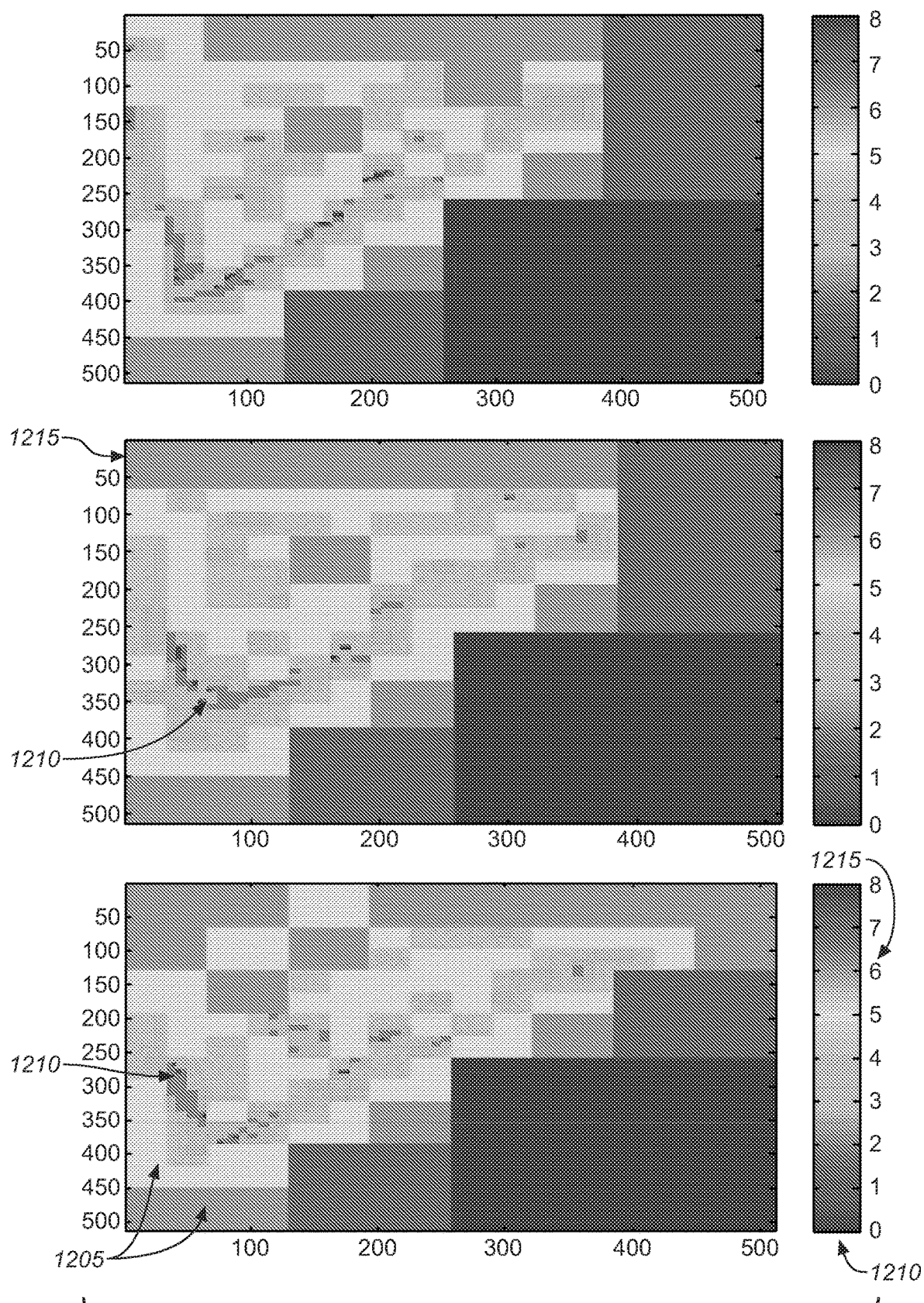

An example of the hierarchical 2D LUT representation is shown in FIGS. 11-12 for an original 513×513 2D LUT R,G,B set. In this case, when using a test reflectance dataset, the hierarchical LUT set shows a mean ΔE error of 1.199 vs. the original (larger) 2D LUT with ΔE=1.191. The total number of storage pool elements used in the hierarchical approach was 3707, 3287, and 2951 for the R, G, and B channels respectively. For a double precision node data representation, the memory requirement is reduced to 0.0126 of that needed by the original LUT, which represents a substantial savings. In some embodiments, the computational cost associated with this method can be considerably lower than the cost for other methods described above, with a compression ratio that can be comparable to those methods.

FIG. 11 illustrates the original 2D LUTs for the R, G, B channels. FIG. 12 illustrates the hierarchical bitmap structure, where the visible blocks (such as 1205) contain unity entries in the bitmap. In FIG. 12, different shades of gray represent different levels, from level 1 (1210) to level 8 (1215).

In some embodiments, the methods described in the present disclosure may be carried out in a color transform device. For example, the color transform device may comprise semiconductor devices such as processors and memory modules. The color transform device may be part of a video camera. For example a video camera may comprise processors and memory modules that applying one or more of the methods described in the present disclosure. In some embodiments, the video camera may be part of a mobile phone, smartphone or other portable computers such as a tablet or a laptop. The color transform device may be an encoder or decoder or may be part of, or integrated with, an encoder or decoder. In some embodiments, the images are from still cameras or video cameras. In some embodiments, the methods of the present disclosure comprise: dividing a first, second, and third LUT (each for one color channel) into zones; for at least one zone, calculating a set of polynomial coefficients for intra-zone approximations; for at least one zone, interpolating the at least one zone based on the its set of polynomial coefficients; and applying a color transform based on the interpolation.

The present disclosure has described embodiments reducing the size of an m×m LUT; however, the methods described herein can also be applied, in other embodiments, to any $m_1 \times m_2$ LUT (where $m_1$ is not equal to $m_2$).

Figure 13:
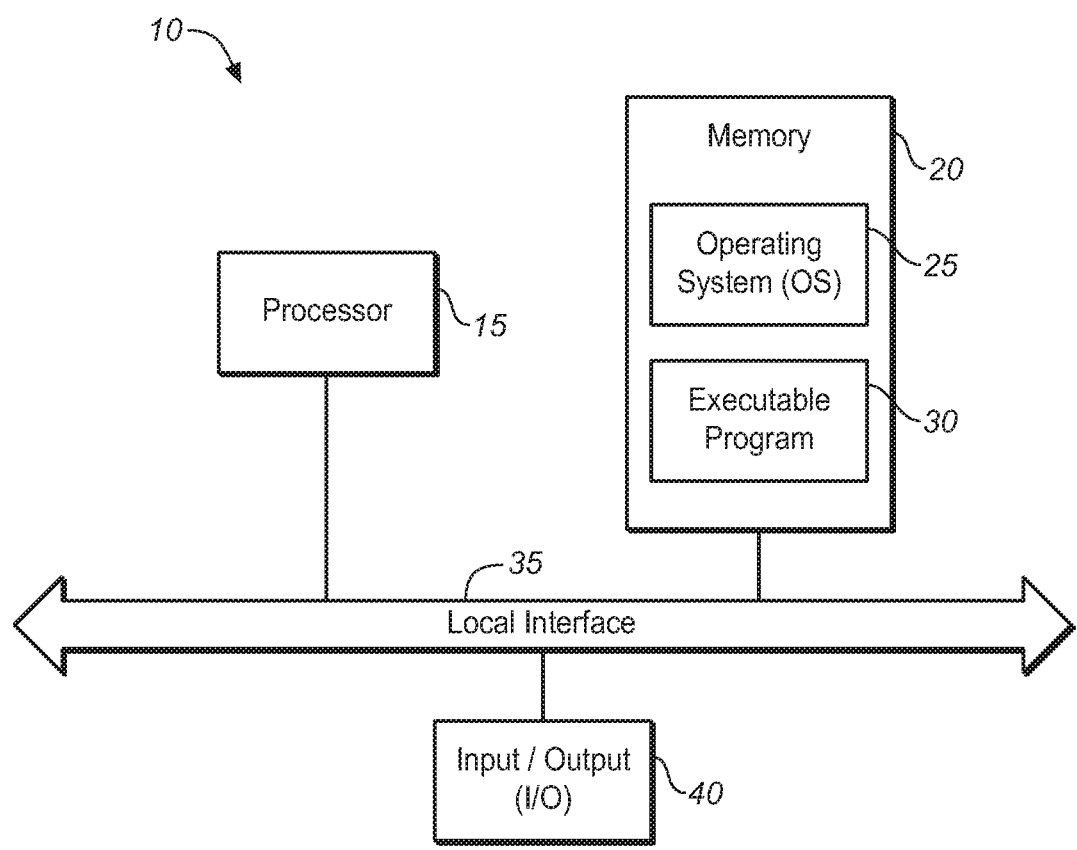
FIG. 13 depicts an exemplary embodiment of a target hardware for implementation of an embodiment of the present disclosure.

FIG. 13 is an exemplary embodiment of a target hardware (10) (e.g., a computer system) for implementing the embodiments of FIGS. 1-12. This target hardware comprises a processor (15), a memory bank (20), a local interface bus (35) and one or more Input/Output devices (40). The processor may execute one or more instructions related to the implementation of FIGS. 3, 6 and 10, and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 13. In some embodiments a plurality of processors may be used in a parallel configuration for added execution speed. In such a case, the executable program may be specifically tailored to a parallel execution. Also, in some embodiments the processor (15) may execute part of the implementation of FIGS. 3, 6 and 10, and some other part may be implemented using dedicated hardware/firmware placed at an Input/Output location accessible by the target hardware (10) via local interface (35). The target hardware (10) may include a plurality of executable programs (30), wherein each may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Various aspects of the present invention may be appreciated from the following enumerated example embodiments (EEEs).

EEE 1. A method comprising:
providing, by a computer, a first, second, and third look up table (LUT) for a first, second, and third color channel, the first, second and third LUTs having m by m dimensionality, wherein m is an integer;
reducing an overall memory footprint of the first, second, and third LUT by decomposing the first, second, and third LUTs each into two LUTs by:
calculating, by the computer, a fourth, fifth, and sixth LUT for the first, second and third color channels, the fourth, fifth, and sixth LUTs having m by k dimensionality, wherein k is an integer smaller than m; and
calculating, by the computer, a seventh LUT having k by m dimensionality,
wherein the first LUT is approximated by multiplying the fourth LUT by the seventh LUT, the second LUTs is approximated by multiplying the fifth LUT by the seventh LUT, the third LUTs is approximated by multiplying the sixth LUT by the seventh LUT, and an overall memory footprint for the fourth, fifth, sixth and seventh LUTs is less than the overall memory footprint of the first, second, and third LUTs; and
applying a color transform from a first color space comprising the first, second, and third color channel, to a second color space based on the reducing the overall memory footprint of the first, second, and third LUT.

EEE 2. The method of EEE 1, wherein calculating, by a computer, a fourth, fifth, and sixth LUT and calculating, by a computer, a seventh LUT are carried out by alternating least square optimization.

EEE 3. The method of EEE 1, wherein the first, second, and third color channels are red, green, and blue.

EEE 4. The method of EEE 1, wherein applying a color transform is in a still or video camera, the still or video camera comprises the computer, and the computer is a video signal processor.

EEE 5. A method comprising:
providing, by a computer, a first, second, and third look up table (LUT) for a first, second, and third color channel;
reducing an overall memory footprint of the first, second, and third LUT by:
a) transforming, by the computer, the first, second, and third LUT into a fourth, fifth, and sixth LUT in a frequency domain;
b) vectorizing, by the computer, fourth, fifth, and sixth LUT by zigzag scanning;
c) selecting L coefficients from the vectorized fourth, fifth, and sixth LUT, wherein L is an integer;
d) calculating, by the computer, a seventh, eighth, and ninth LUT from the vectorized fourth, fifth, and sixth LUT, by inverse zigzag scanning;
e) applying an inverse frequency domain transform to the seventh, eighth, and ninth LUT;
f) approximating the first, second, and third LUT by the inverse frequency domain transformed seventh, eighth, and ninth LUT;
g) calculating a color metric difference from the first, second, and third LUT and the inverse frequency domain transformed seventh, eighth, and ninth LUT, based on a spectral reflectance database; and
h) if the color metric difference is greater than a threshold, increasing L and iterating from c) to h); and
applying a color transform from a first color space, comprising the first, second, and third color channel, to a second color space based on the reducing the overall memory footprint of the first, second, and third LUT.

EEE 6. The method of EEE 5, wherein transforming, by the computer, the first, second and third LUT in the frequency domain is by discrete cosine transform.

EEE 7. The method of EEE 6, wherein applying an inverse frequency domain transformation is by inverse discrete cosine transform.

EEE 8. The method of EEE 5, wherein the first, second, and third color channels are red, green, and blue.

EEE 9. The method of EEE 5, wherein applying a color transform is in a still or video camera, the still or video camera comprises the computer, and the computer is a video signal processor.

EEE 10. A method comprising:
providing, by a computer, a first, second, and third look up table (LUT) for a first, second, and third color channel;
reducing an overall memory footprint of the first, second, and third LUT by subsampling the first, second, and third LUT by:
dividing, by the computer, the first, second, and third LUT into zones; for each zone, calculating a set of polynomial coefficients for intra-zone approximations;
for each zone, interpolating the zone based on its set of polynomial coefficients; and
applying a color transform from a first color space comprising the first, second, and third color channel, to a second color space based on the subsampled first, second, and third LUT.

EEE 11. The method of EEE 10, wherein the first, second, and third color channels are red, green, and blue.

EEE 12. The method of EEE 10, wherein applying a color transform is in a still or video camera, the still or video camera comprises the computer, and the computer is a video signal processor.

EEE 13. The method of EEE 10, wherein calculating a set of polynomial coefficients comprises:
calculating, by the computer, a Taylor approximation for each zone, wherein the Taylor approximation is a planar, bilinear approximation with two chromaticities as independent variables; and
reducing the Taylor approximation to a polynomial form by grouping terms of the Taylor approximation having a same order for the independent variables.

EEE 14. A method comprising:
providing, by a computer, a first, second, and third look up table (LUT) for a first, second, and third color channel;
reducing an overall memory footprint of the first, second, and third LUT by approximating the first, second, and third LUT by:
generating, by the computer, a hierarchy of levels for the first, second, and third LUT;
dividing, by the computer, each level into merge bitmap zones;
calculating for each merge bitmap zone a zero or one value;
if a merge bitmap value is zero, increasing one level and analyzing the merge bitmap values at the increased level; and
if a merge bitmap value is one, accessing a storage pool associated with that merge bitmap and approximating that merge bitmap based on its associated storage pool; and
applying a color transform from a first color space comprising the first, second, and third color channel, to a second color space based on the reducing the overall memory footprint of the first, second, and third LUT.

EEE 15. The method of EEE 14, wherein the hierarchy of levels comprises 8 levels having a monotonically increasing number of merge bitmap zones from a first level to an eight level.

EEE 16. The method of EEE 14, wherein the first level has a 2×2 merge bitmap zone and a second level has a 4×4 merge bitmap zone.

EEE 17. The method of EEE 14, wherein each storage pool associated with a merge bitmap having a value of one comprises four nodes.

EEE 18. The method of EEE 14, wherein the first, second, and third color channels are red, green, and blue.

EEE 19. The method of EEE 14, wherein applying a color transform is in a still or video camera, the still or video camera comprises the computer, and the computer is a video signal processor.

EEE 20. A still or video camera comprising an image signal processor and a memory, the image signal processor configured to perform the following steps:
providing, by the image signal processor, a first, second, and third look up table (LUT) for a first, second, and third color channel, the first, second and third LUTs having m by m dimensionality, wherein m is an integer;
reducing an overall memory footprint of the first, second, and third LUT by decomposing the first, second, and third LUTs each into two LUTs by:
calculating, by the image signal processor, a fourth, fifth, and sixth LUT for the first, second and third color channels, the fourth, fifth, and sixth LUTs having m by k dimensionality, wherein k is an integer smaller than m; and
calculating, by the image signal processor, a seventh LUT having k by m dimensionality,
wherein the first LUT is approximated by multiplying the fourth LUT by the seventh LUT, the second LUTs is approximated by multiplying the fifth LUT by the seventh LUT, the third LUTs is approximated by multiplying the sixth LUT by the seventh LUT, and an overall memory footprint for the fourth, fifth, sixth and seventh LUTs is less than the overall memory footprint of the first, second, and third LUTs; and
applying a color transform from a first color space comprising the first, second, and third color channel, to a second color space based on the reducing the overall memory footprint of the first, second, and third LUT.

EEE 21. A still or video camera comprising an image signal processor and a memory, the image signal processor configured to perform the following steps:
providing, by the image signal processor, a first, second, and third look up table (LUT) for a first, second, and third color channel;
reducing an overall memory footprint of the first, second, and third LUT by:
i) transforming, by the image signal processor, the first, second, and third LUT into a fourth, fifth, and sixth LUT in a frequency domain;
j) vectorizing, by the image signal processor, fourth, fifth, and sixth LUT by zigzag scanning;
k) selecting L coefficients from the vectorized fourth, fifth, and sixth LUT, wherein L is an integer;
l) calculating, by the image signal processor, a seventh, eighth, and ninth LUT from the vectorized fourth, fifth, and sixth LUT, by inverse zigzag scanning;
m) applying an inverse frequency domain transform to the seventh, eighth, and ninth LUT;
n) approximating the first, second, and third LUT by the inverse frequency domain transformed seventh, eighth, and ninth LUT;
o) calculating a color metric difference from the first, second, and third LUT and the inverse frequency domain transformed seventh, eighth, and ninth LUT, based on a spectral reflectance database; and p) if the color metric difference is greater than a threshold, increasing L and iterating from c) to h); and applying a color transform from a first color space, comprising the first, second, and third color channel, to a second color space based on the reducing the overall memory footprint of the first, second, and third LUT.

EEE 22. A still or video camera comprising an image signal processor and a memory, the image signal processor configured to perform the following steps:

providing, by the image signal processor, a first, second, and third look up table (LUT) for a first, second, and third color channel;

reducing an overall memory footprint of the first, second, and third LUT by subsampling the first, second, and third LUT by:

dividing, by the image signal processor, the first, second, and third LUT into zones;

for each zone, calculating a set of polynomial coefficients for intra-zone approximations;

for each zone, interpolating the zone based on its set of polynomial coefficients; and applying a color transform from a first color space comprising the first, second, and third color channel, to a second color space based on the subsampled first, second, and third LUT.

EEE 23. A still or video camera comprising an image signal processor and a memory, the image signal processor configured to perform the following steps:

providing, by the image signal processor, a first, second, and third look up table (LUT) for a first, second, and third color channel;

reducing an overall memory footprint of the first, second, and third LUT by approximating the first, second, and third LUT by:

generating, by the image signal processor, a hierarchy of levels for the first, second, and third LUT;

dividing, by the image signal processor, each level into merge bitmap zones;

calculating for each merge bitmap zone a zero or one value;

if a merge bitmap value is zero, increasing one level and analyzing the merge bitmap values at the increased level; and if a merge bitmap value is one, accessing a storage pool associated with that merge bitmap and approximating that merge bitmap based on its associated storage pool; and applying a color transform from a first color space comprising the first, second, and third color channel, to a second color space based on the reducing the overall memory footprint of the first, second, and third LUT.

What is claimed is:

1. A method comprising:

obtaining a first chromaticity parameter and a second chromaticity parameter from $\Psi$ input colour channels, wherein $\Psi$ is an integer greater than 1;

using the first chromaticity parameter as an index to retrieve a row of k values from an m×k matrix, wherein m and k are integers larger than 0 and $(\Psi+1)mk$ is less than $\Psi m^2$;

using the second chromaticity parameter as an index to retrieve a column of k values from a k×m matrix, wherein the product of the m×k matrix and the k×m matrix is an m×m matrix which approximates a colour transform LUT corresponding to a first one of the input colour channels;

using vector multiplication to compute a single value from the row of k values and the column of k values;

storing or outputting the single value as an intermediate value suitable for obtaining an unscaled output colour channel value corresponding to the first one of the input colour channels;

using the first chromaticity parameter as an index to retrieve a second row of k values, from a second m×k matrix, wherein the product of the second m×k matrix and the k×m matrix is an m×m matrix which approximates a colour transform LUT corresponding to a second one of the input colour channels;

using vector multiplication to compute a second single value, from the second row of k values and the column of k values; and storing or outputting the second single value as an intermediate value suitable for obtaining an unscaled output colour channel value corresponding to the second one of the input colour channels.

2. The method of claim 1, further comprising:

using the first chromaticity parameter as an index to retrieve a third row of k values, from a third m×k matrix, wherein the product of the third m×k matrix and the k×m matrix is an m×m matrix which approximates a colour transform LUT corresponding to a third one of the input colour channels;

using vector multiplication to compute a third single value, from the third row of k values and the column of k values; and storing or outputting the third single value as an intermediate value suitable for obtaining an unscaled output colour channel value corresponding to the third one of the input colour channels.

3. A non-transitory computer-readable storage medium having stored thereon computer-executable instructions for executing a method with one or more processors in accordance with claim 1.

4. An apparatus comprising a processor configured to perform the method of claim 1.

5. A method comprising:

obtaining a first chromaticity parameter and a second chromaticity parameter from $\Psi$ input colour channels, wherein $\Psi$ is an integer greater than 1;

using the first chromaticity parameter as an index to retrieve a row of k values from an m×k matrix, wherein m and k are integers larger than 0 and $(\Psi+1)mk$ is less than $\Psi m^2$;

using the second chromaticity parameter as an index to retrieve a column of k values from a k×m matrix, wherein the product of the m×k matrix and the k×m matrix is an m×m matrix which approximates a colour transform LUT corresponding to a first one of the input colour channels;

using vector multiplication to compute a single value from the row of k values and the column of k values;

storing or outputting the single value as an intermediate value suitable for obtaining an unscaled output colour channel value corresponding to the first one of the input colour channels;

using the second chromaticity parameter as an index to retrieve a second column of k values, from a second k×m matrix, wherein the product of the m×k matrix and the second k×m matrix is an m×m matrix which approximates a colour transform LUT corresponding to a second one of the input colour channels;

using vector multiplication to compute a second single value, from the row of k values and the second column of k values; and storing or outputting the second single value as an intermediate value suitable for obtaining an unscaled output colour channel value corresponding to the second one of the input colour channels.

6. The method of claim 5, further comprising:

using the second chromaticity parameter as an index to retrieve a third column of k values, from a third k×m matrix, wherein the product of the m×k matrix and the third k×m matrix is an m×m matrix which approximates a colour transform LUT corresponding to a third one of the input colour channels;

using vector multiplication to compute a third single value, from the row of k values and the third column of k values; and storing or outputting the third single value as an intermediate value suitable for obtaining an unscaled output colour channel value corresponding to the third one of the input colour channels.

7. The method of claim 6, wherein the first, second and third ones of the input colour channels are R, G and B channels, respectively.

8. A method comprising:

a) receiving three m×m colour transform lookup tables, each corresponding to a different colour channel, wherein m is an integer larger than 0;

b) determining an integer k larger than 0 whereby 6mk is less than or equal to $3 m^2$;

c) using matrix factorisation to obtain a respective pair of smaller matrices from each of the m×m colour transform lookup tables, wherein each of the pairs of smaller matrices consists of an m×k matrix and a k×m matrix, the product of which is an m×m matrix that approximates a respective one of the three m×m colour transform lookup tables;

d) using the three pairs of smaller matrices to perform a colour transform;

e) determining an average colour error metric value for the performed colour transform;

f) comparing the determined average colour error metric value with an average colour error metric value determined for a colour transform performed using the three m×m colour transform lookup tables; and g) if the compared average colour error metric values differ by more than a threshold amount, increase k, wherein steps c) to g) are repeated until the average colour error metric values do not differ by more than a threshold amount, and then storing or outputting the three pairs of smaller matrices, and wherein at least two of the pairs of smaller matrices share one of a common k×m matrix or a common m×k matrix, and 5mk is less than or equal to $3 m^2$; or wherein the three pairs of smaller matrices share one of a common k×m matrix or a common m×k matrix, and 4mk is less than or equal to $3 m^2$.

9. The method of claim 8 wherein the average colour error metric values are of a type selected from: the CIE 1976 color error metric ($\Delta E_{1976}$); the CIE 1994 color error metric ($\Delta E_{1994}$); or the CIE 2000 color error metric ($\Delta E_{2000}$).

10. A non-transitory computer-readable storage medium having stored thereon computer-executable instructions for executing a method with one or more processors in accordance with claim 8.

11. An apparatus comprising a processor configured to perform the method of claim 8.

* * * * *